(12) United States Patent
Nimri et al.

(10) Patent No.: US 9,843,770 B2
(45) Date of Patent: Dec. 12, 2017

(54) PANORAMIC IMAGE PLACEMENT TO MINIMIZE FULL IMAGE INTERFERENCE

(71) Applicant: Polycom, Inc., San Jose, CA (US)

(72) Inventors: Alain Elon Nimri, Austin, TX (US); Shu Gao, Round Rock, TX (US); Stephen Schaefer, Cedar Park, TX (US); Robert Murphy, Cedar Park, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/252,093

(22) Filed: Aug. 30, 2016

(65) Prior Publication Data
US 2017/0099461 A1    Apr. 6, 2017

Related U.S. Application Data

(60) Provisional application No. 62/237,344, filed on Oct. 5, 2015.

(51) Int. Cl.
| | |
|---|---|
| *H04N 7/15* | (2006.01) |
| *H04N 7/14* | (2006.01) |
| *H04N 5/232* | (2006.01) |
| *G10L 21/028* | (2013.01) |
| *G10L 25/72* | (2013.01) |

(52) U.S. Cl.
CPC .......... *H04N 7/152* (2013.01); *G10L 21/028* (2013.01); *G10L 25/72* (2013.01); *H04N 5/23238* (2013.01); *H04N 7/147* (2013.01)

(58) Field of Classification Search
CPC ........ H04N 7/14; H04N 7/15; H04N 5/23238; H04N 21/4788; H04N 5/3415; H04N 3/1593; H04M 3/567
See application file for complete search history.

(56) References Cited

U.S. PATENT DOCUMENTS

| | | | | |
|---|---|---|---|---|
| 6,937,266 | B2 * | 8/2005 | Rui | H04N 7/142 348/14.05 |
| 8,502,857 | B2 * | 8/2013 | Halavy | H04N 7/147 348/14.03 |
| 8,572,183 | B2 * | 10/2013 | Sharma | G06Q 10/10 709/204 |
| 2004/0254982 | A1 * | 12/2004 | Hoffman | H04L 29/06027 709/204 |
| 2006/0017807 | A1 * | 1/2006 | Lee | B60R 1/00 348/36 |

* cited by examiner

*Primary Examiner* — Stella Woo
(74) *Attorney, Agent, or Firm* — Blank Rome, LLP

(57) ABSTRACT

An automatic process for producing professional, directed, production crew quality, video for videoconferencing is described. Rule based logic is integrated into an automatic process for producing director quality video for videoconferencing. An automatic process can include a method for composing a display for use in a video system having an active talker video stream and a panoramic view video stream having more than one person in video. The method can include determining a region of interest in a panoramic view video using motion detection and presence sensors, and preparing the panoramic view video by centering the region of interest and by zooming towards the region of interest, based upon the location of persons in the panoramic view video. The method includes determining placement of panoramic view video on a composite display to prevent the panoramic view video overlaying display of an active talker on the active talker video stream.

20 Claims, 31 Drawing Sheets

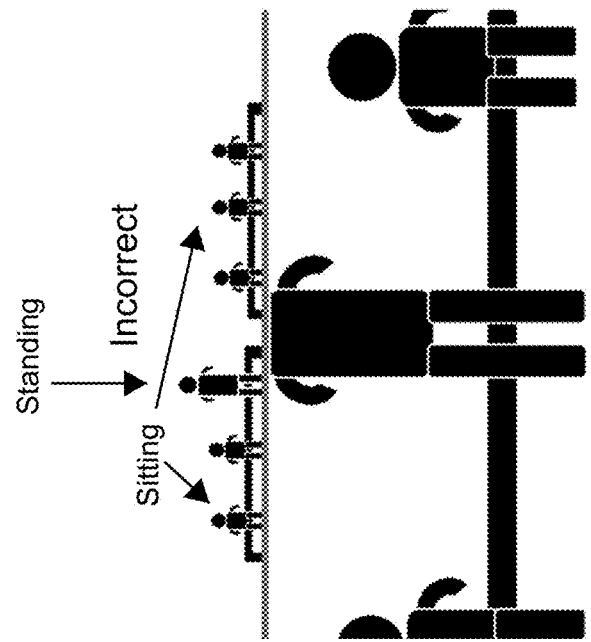
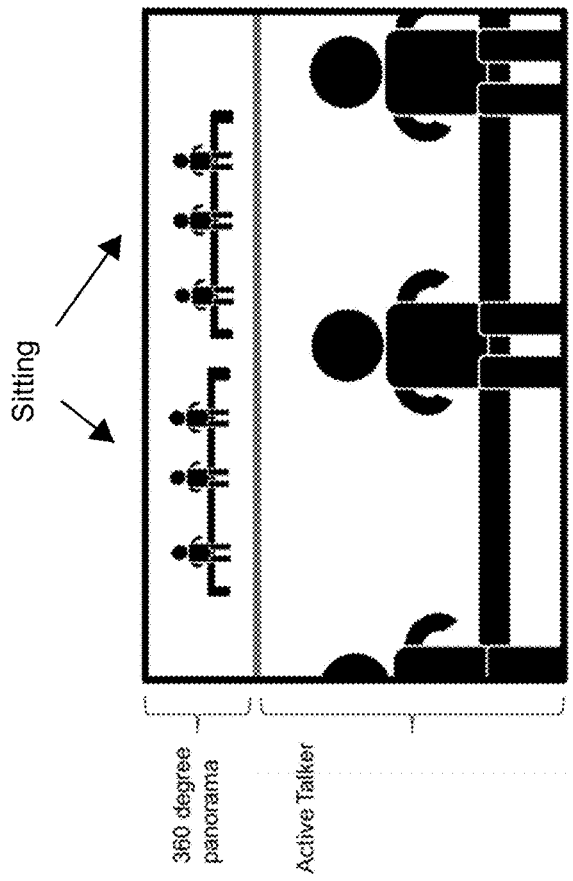
FIG. 7A
FIG. 7B

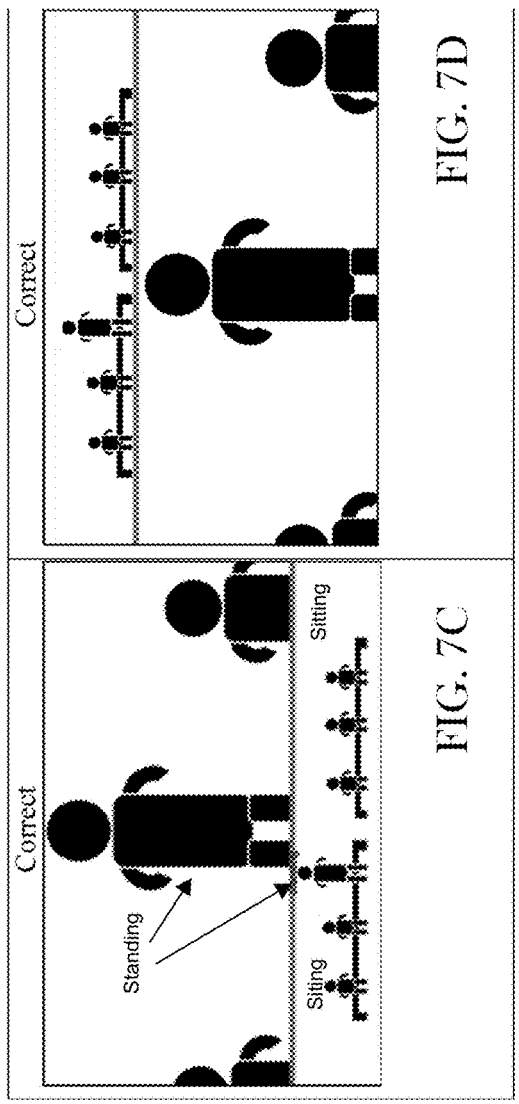

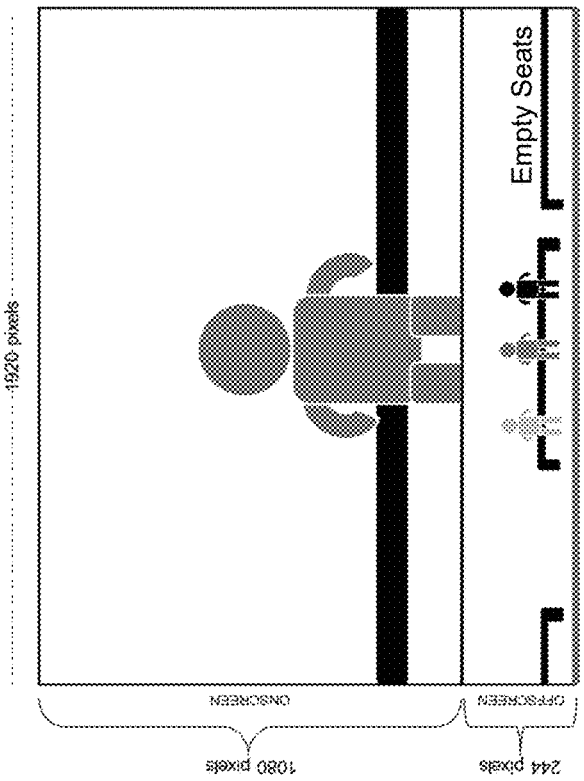
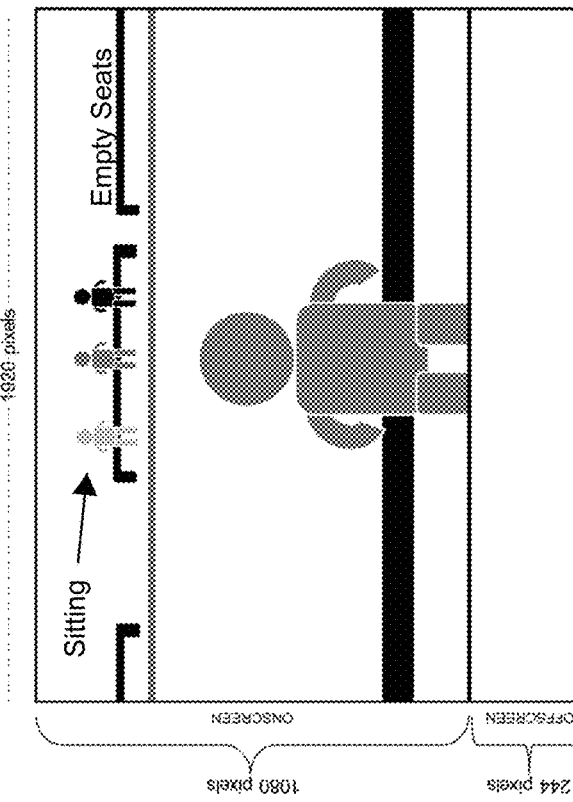

Video Production Rule 4 – Silent Rule

- When near side is silent, keep current layout.
- When near side has been silent for more than 40 seconds, send the "stacked strip" view
- When near side is muted, send the "stacked strip" view immediately

FIG. 12N

PANORAMIC IMAGE PLACEMENT TO MINIMIZE FULL IMAGE INTERFERENCE

CROSS-REFERENCE TO RELATED APPLICATION

This application claims priority to U.S. Provisional Application No. 62/237,344, filed Oct. 5, 2015, the contents of which are entirely incorporated by reference herein. This application is related to U.S. application Ser. No. 15/252,078, filed Aug. 30, 2016, and to U.S. application Ser. No. 15/252,085, filed Aug. 30, 2016, the contents of which applications are entirely incorporated by reference herein.

TECHNICAL FIELD

This disclosure relates to the field of video processing for videoconferencing calls. More particularly, automatically processing video to achieve production quality conference programming for videoconferences based on sensor data received from a video conference room.

BACKGROUND

This disclosure relates generally to improving the quality of video produced for viewing on destination displays during video conference calls and reducing human involvement in the process.

Video conferencing has become ubiquitous. Large companies with multiple work sites invest large sum of money to establish private communication networks in each site and between sites of the corporations. The communication networks include packet-based networks or circuit switch networks or both packet-based networks and circuit switch networks.

To establish the private communication networks, large companies distribute a large number of multimedia endpoints throughout the company. Usually, one or more multipoint control units (MCUs) are purchased to serve the internal multipoint multimedia conferencing needs of these endpoints. The MCUs can be installed in one or more different company sites (e.g., at a particular company building, or within a city or region) to generally serve the multipoint needs of the endpoints local to that site. The result is that the various MCUs of the company may be distributed throughout a large region, such as throughout a country or throughout the globe.

As is known in the art, a multimedia endpoint is a terminal on a network. The multimedia endpoint is capable of providing real-time, two-way audiovisual communication with other terminals or an MCU. As is known in the art, an MCU is a conference control entity located in a node of the network or in a terminal. The MCU receives several media channels from access ports. According to certain criteria, the MCU processes audiovisual and data signals and distributes them to the connected channels. Examples of MCUs include those available from Polycom Inc. Additional information about MCUs can be found at the website of www.polycom.com, which is incorporated herein by reference. A more thorough definition of an endpoint (terminal) and an MCU can be found in the International Telecommunication Union ("ITU") standards such as but not limited to the H.320, H.324, and H.323 standards, which are incorporated herein by reference. (The ITU is the United Nations Specialized Agency in the field of telecommunications. Additional information regarding the ITU can be found at the website address of www.itu.int). The MCU are used in various ways including cascading to establish multi-site video conferences both inside and outside of organizations.

Video conferences between two sites or multiple sites sometimes lack the intimacy and closeness of a TV production. The video streamed to far sites in video conferences is often far from optimal. The video image of the room captured and sent to the far site is typically decided by some camera setting or by the last position of a pan tilt zoom camera. Generally, participants focus on the meeting and not so much on the format and content of the video they are sending to the far sites. The great majority of participants do not direct the camera to focus on the speakers in the room, often leaving the camera pointed at blank space, someone rustling papers, or a far-away view of the speaker.

Pointing the camera is still a manual operation and usually the camera may be zoomed out all the way so that everyone is in the picture, with little regard to a close up that shows people's expressions clearly to the far site. The viewing experience if far from optimal at the receiving end of a conference when little or no attention is given to showing the participants who are talking or engaged in discussions.

This occurs for several reasons, including that many participants are unwilling or unable to operate the camera guidance systems and because most participants are not trained on use of the camera guidance systems. Further, when participants take the time and attention to direct the camera, their attention is drawn away from the subject matter of the conference. Assigning an extra staff person on-site to sit through the conference simply to direct the camera is cost prohibitive, inefficient, and can be ineffective if the staff person is not familiar with the subject matter, status of the participants, and people involved.

Tracking cameras may be used (such as those sold be Polycom) that locate people and track them via their voice and their faces. This is better than leaving the camera still, but the quality is not near what one would get with a TV production crew filming the meeting or event.

Video conferencing with a 360 degree camera or other types of cameras located in the middle of the room is now possible. Often circular or oval seating arrangements are used. Circular seating arrangements in video conference rooms provide an advantage in allowing participants to interact and communicate more comfortably with everyone in the room. In fact, in a conference room where people meet in a circle, they are able to interact with each other better than in a traditional rectangular conference room. Each person can see other individuals in the room equally without having to turn their heads to see someone in the circle. To capture this interaction for video conferencing, a 360 degree or like camera is placed in the middle of the room. When two people in the local conference room engage in a discussion, there is a need for the camera to capture both people at the same time even though they may not be seated next to each other. Preferably, there is proper positioning of the two speaking individuals in the composed video for the conference. These video conferencing systems face problems when participants are not looking at the camera.

Currently to perform the task of composing video for a meeting of individuals seated in an oval circle, multiple camera operators are needed to frame the talkers properly and expensive video switcher and mixing equipment is needed to composite the two camera images together. A human director is needed to determine which side of the screen to place the talkers so that they will appear to be talking towards each other. These problems also exist for people seated in a rectangular arrangement.

Also, in a conference room with a 360 degree panoramic camera, the video system has two video streams: an active talker window (or region of interest) and a panoramic view of the room. Currently these two video streams are transmitted separately to a far site and generally displayed separately. To combine these two video streams in a useful manner requires a user to manually place the strip somewhere on a video layout.

What is needed is a system and method to process video with at least less human involvement, if not little or no human involvement. What is needed is a system and method for automatically processing video for video conferences using sensor data. What is needed is an automated video production crew. What is needed is an automatic system for processing video from 360 degree cameras and from 360 degree panoramic cameras.

SUMMARY

An automatic process for producing professional, directed, production crew quality, video for videoconferencing is described. Rule based logic is integrated into an automatic process for producing director quality video for videoconferencing.

The automatic process uses sensor data, such as from microphones, infrared and motion sensors, to process video streams for video conferencing. Based on the sensor input, rule based logic is used to process video streams and produce production quality displays for videoconferencing. More particularly, a method and system for automatically processing sensor data on room activity into general room analytics for further processing by application of rules based logic to produce production quality video for use in videoconferencing is described. Various sensory devices and equipment, for example motion, infrared, audio, sound source localization (SSL) and video are used to detect room activity or room stimuli. The room activity is analyzed (for example, to determine whether individuals are in the subject room, speaker identification and movement within the room) and processed to produce room analytics. The room activity and/or room analytics are analyzed to determine a region of interest in the room. Video is acquired for the region of interest in the room.

Rule based logic is then applied to the room analytics to assist with the automatic processing of video into director quality video production. Various cameras and video sources, for example wide angled cameras, 360 degree cameras, 360 degree panoramic, mirrored and multiple cameras may be used as the video stream sources for the automated system. Multiple video sources within a video conferencing room may be fed to the automated video production system. Various audio devices such as microphones may be used to receive sound signals which are processed at the same time or nearly the same time as the video. The director quality video production is then streamed to other sites for purposes of video conferencing.

Sensory information and room analytics from multiple sites may be gathered and analyzed to determine for example, which room and video has the primary speaker and which rooms are simply listening to the primary speaker.

In sum, using sensors placed in a room with cameras, a professional production quality video stream is produced for viewing and listening to the activity occurring within the room. The process is automated so that from sensory input to produced video output no human interaction is required to acquire sensor input, generate room analytics, assess the room analytics, process the video and audio and direct the production of video output for viewing.

In one embodiment, sensory devices are used as input to stimulus detectors to determine room activity or room analytics. The room analytics are looking for or solving for 12 analytics. In other embodiments a greater or lesser number of analytics are used. The room analytics are then fed into a room director program to apply production rules.

The production rules are grouped into three sets: macro, micro and global. Which macro and micro rules are to be used is generally determined by the sensors and room analytics. Which macro rules apply are dependent on video conferencing scenarios (e.g. near site talking/far site silent, far site talking/near site silent, both sites talking). Which micro rules to apply are dependent upon room analytics for the particular room being processed or "directed." Generally, global rules apply in all circumstances and supersede or overrule macro and micro rules.

In one embodiment, the sensory data or sensory input is gathered and the room analytics are generated. The room analytics are then assessed for placement of the system into one of several modes of operation. Different micro rules are applied based upon the mode of operation. In one embodiment there are five modes of operation: (1) establishing, (2) silence, (3) talker, (4) presenter, and (5) two speaker mode. Variations and additional modes, such as interrupter mode, are possible.

Once the mode of operation is determined, video production micro rules relevant to the mode are applied to produce the director quality video stream. In some embodiments, based on the assessed room analytics, sub-modes are determined such as extended presenter mode. Micro rules for the sub-mode are then applied to achieve the desired video processing results.

When in the two speaker modes, that is two speakers in one room, it is desirable to have the two speakers appear as if they are speaking with each other. In television productions, a director tries to use camera angles that make it look like the people onscreen are talking to each other. This can be accomplished in video production by making talker's faces point towards each other. This way they appear to be interacting with each other. It is desirable for the micro rules to direct the video and create appropriate video production layouts in which the two speakers are facing each other.

In a video conferencing system with a 360 degree panoramic view camera and a primary region of interest or active talker view, two video signals or streams are being transmitted to the far site. It is desirable to put the two video streams together and have a single video transmission. It is desirable to produce a combined video stream that is widely interoperable with existing video products. It is also desirable to produce the video for display without obscuring the person who is the active talker. The operations indicated are currently done manually or not at all. The picture sent to the far site is not optimum for viewing by the local participants if production rules are not applied.

Also, based on the number of people and their location in the room, it is desirable for the video system to aesthetically center the people in the panoramic strip. When compositing the two video streams (active video and panoramic), there needs to be a method to determine where to place the panorama—on top, bottom, or not on top of the active talker. It is desirable to produce an intelligent layout where the panoramic video does not obscure an important region of interest in the active video.

Panoramic 360 degree video strips can also be accordioned and modified to eliminate areas with no individuals. This allows for greater zooming and better views of individuals.

The processing of video for an accordion appearance and/or the elimination of regions of less interest is described.

BRIEF DESCRIPTION OF THE DRAWINGS

A more complete appreciation of this disclosure and many of the attendant advantages thereof will be readily obtained as the same becomes better understood by reference to the following detailed description when considered in conjunction with the accompanying drawings, wherein:

FIG. 7A-7K show implementations of Video Production Rule 3, including a block diagram using "compositing logic" to implement placement of framing and placement of Panoramic Strip.

DETAILED DESCRIPTION

Figure 1:
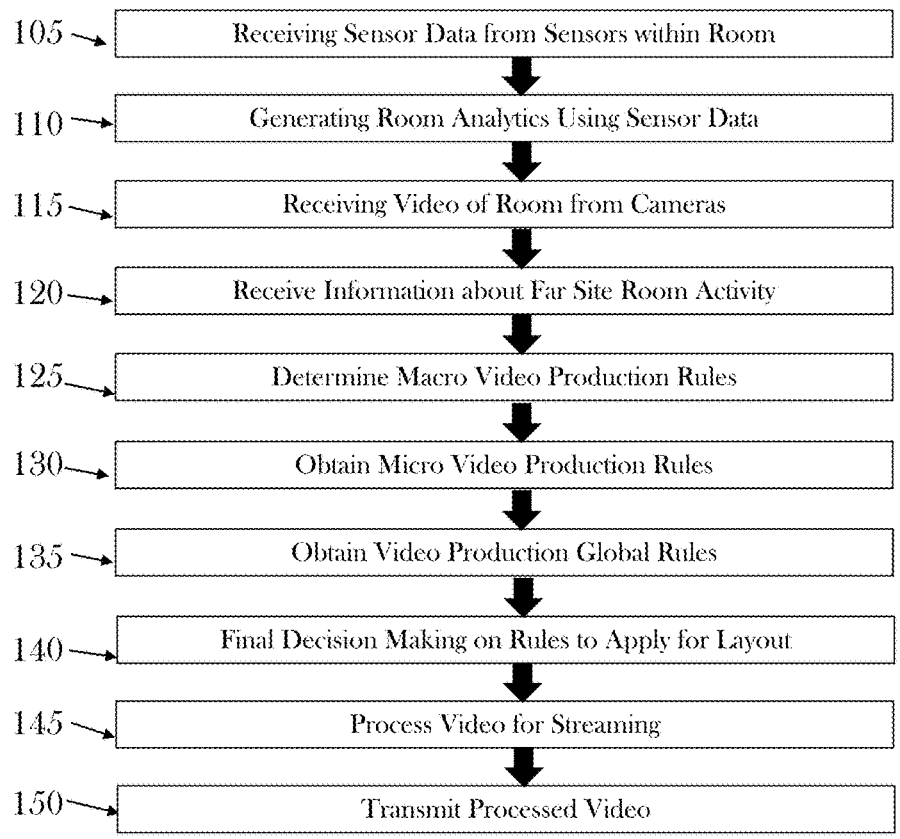
FIG. 1 is a diagram of the exemplary method steps for automatically producing video.

Multisite video conferencing and equipment to establish multisite video conferencing is well known. Information on video conferencing can be found at Polycom Corporation's website www.polycom.com. Equipment that is capable of managing the layout of multiple video streams for display on destination sites, including the use of multipoint control units (MCUs), is also well known and described in detail in U.S. Pat. No. 9,088,692 which is hereby incorporated in its entirety by reference. Equipment located at a particular conference room or endpoint is also well known and is described for example in U.S. Pat. No. 9,088,692 and U.S. Pat. No. 8,964,604 which are hereby incorporated by reference.

Endpoint equipment at a video site generally includes one or more microphones, speakers, audio interfaces, cameras, monitors, CPUs, memory devices, video interfaces, control modules, network interfaces user control interfaces and user controls. Endpoint or on site room monitoring equipment may include sensory devices of all types including motion, infrared, sound etc. MCUs may be used in the automatic video production system. In one embodiment, the MCUs are programed or configured to perform the automatic processing of macro, micro and global rules for video production Referring generally to FIGS. 1 thru 6, apparatus and processes for automatically processing video for professional layout are described. Various methods are disclosed for applying rule based logic to the processing of video.

In some embodiments, methods and processes are described for accepting room sensory data and generating room analytics. The generated room analytics are then assessed using a set of guidelines. The assessed room analytics inform and guide the automatic rule based processing of video received from the room. In other words, the assessed room analytics help direct the processing of the video production.

The video feeds are processed to place speakers and activity occurring in the room in appropriate locations on screen for viewing by video conference attendees or participants. Establishing shots and zooming shots are used to create the effect that the production is being guided by a director and the video is being shot by a production crew. Panoramic views, split screen, strip views and stacked strips are also used to provide a high quality video production experience to the viewer. The end product is a production quality video stream for individuals outside the room to watch activity in the room on a monitor. The video is processed and produced without a cameraman, production crew, or audio staff, and without a director. Ultimately, directed production quality conference programming is produced for viewing by participants of the video conference.

As part of the production process audio signals are also analyzed, processed and if appropriate refined. While general room sound can be broadcast or streamed, the audio can be manipulated to improve the quality. For example, the audio can be focused on sound from a certain part of the room, background noises can diminished or eliminated, and/or sound from other parts of the room can be reduced.

FIG. 1 shows an overview of steps for one embodiment of the automatic professional video processing system 100. FIG. 1 depicts a nine step process which take the video system from receiving data to transmission of produced video 100. These nine steps may be performed in a different order or combination and some steps may be skipped.

In this method, the system receives sensor data from sensors which are located within the subject room 105. Generally, the sensors in the room are continuously providing data on the condition of the room including for example whether the room is empty, silent, and whether there is motion. Numerous sensor devices of varying types may be used to collect the sensory data. Usually the sensory data is converted to digital format before it is passed to the processing routine which analyzes the sensor data.

In this embodiment, the sensory data is gathered and used to generate room analytics 110. By processing the received sensory data, the system is able to determine whether one of several states or modes exist in the room. For example, whether the room is silent for an extended period of time, whether one person is talking, how long the person has spoken, whether the person is being interrupted, whether there are two speakers, whether room is empty, etc.

The following step is receiving video of the room from cameras 115. The video processing equipment will sometimes receive multiple video feeds from more than one camera in the room. In some embodiments 360 degree view cameras and 360 degree panoramic cameras are used. Various types of cameras and specialty cameras may be used with the automatic video processing system.

The automatic video processing system also receives information about the far site room activity 120. Just as sensor and room analytics provide information for the video processing system to determine the state or mode of the near site room, similar information is provided on the state and mode of the far site room. This information is typically received from the far site in a processed state, typically when the far site has already determined the state or mode of the far site room. In this way, the video processing equipment is provided the conclusory information on the state or mode of the far site room.

Once the sensory data has been gathered and analyzed, the rules based logic is applied prior to processing the video. There are a number of variations on the method in which to determine and apply the video production rules. The video production rules themselves may also be altered from one implementation to another.

Three types of rules are applied by the system to achieve the director quality video production, macro rules, micro rules and global rules. The macro rules relate to activities among video conferencing locations, the micro rules relate to activities within a room and the global rules apply overall and override the other rules.

Macro Rules, which are largely dependent upon video conferencing location scenarios, include, for example (i) near site talking with far site listening, (ii) far site talking with near site listening, (iii) two rooms talking and (iv) discussion mode. The micro rules relate to activity within a room based on room analytics or room stimulus perceived by the system from received sensory input. Generally, global rules are applied across all video conferencing scenarios and room stimulus.

After the automatic video processing system has received the information it needs for processing, it determines what rule based logic rules to apply under the circumstances. In this particular embodiment, the system determines which macro video production rules to apply 125 prior to application of any global rules. The determination of which macro video production rules to apply 125 is often largely based upon the status of the various video conferencing sites. The macro rules change depending upon which site or sites have speakers and which site or sites are silent. The macro video production rules focus upon the speakers or actors at the sites that have activity and speakers. For those sites that are not as active, the macro rules provide for more general shots or views, such as a panoramic view of the room.

The system determines micro video production rules 130 largely based upon near site room analytics or near site room stimulus information. The micro rules often differ based upon whether establishing shots, silent room views, single talker views, presenter views or two speaker views are appropriate for a room. The system uses room analytics and/or stimulus results to determine which micro rules are desirable to be applied.

Global rules are obtained 135 in the video production process often after micro and macro rules. A final decision making process regarding which rules to apply is made by the system 140. The final decision making 140 is the arbitrator between which of the rules macro, micro and global will be applied as well as how they will be applied. In the system's final determination of which video production processing rules to apply, global rules are typically applied last since the global rules generally will supersede or override micro and macro rules.

Once a final determination is made of which video production rules will be applied 140, the system can apply the rules and process the video in preparation of streaming 145. Afterwards, the processed video is ready to be transmitted 150 to other sites for viewing.

Figure 2:
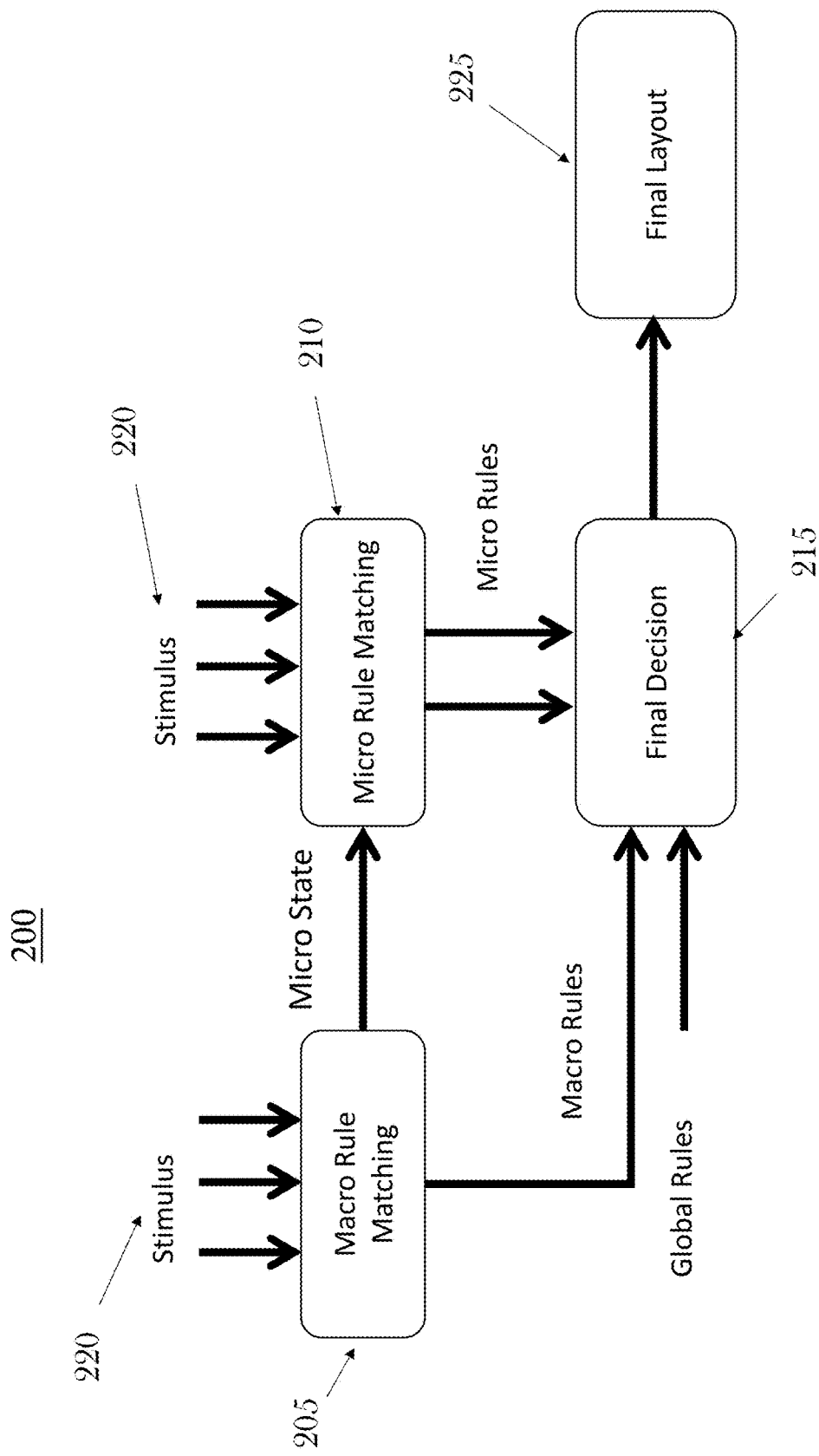
FIG. 2 shows the decision making structure for macro and micro rule matching.

FIG. 2 depicts the overall decision making structure for one embodiment of the professional video production system. In this matching embodiment 200, the macro rule matching 205 and micro rule matching 210 are conducted prior to final decision processing 215 on the video production rules to apply to the video layout. In this embodiment, stimulus states 220 are identified and used as input into each of the matching algorithms 205, 210.

As is described in greater detail with reference to FIGS. 5 and 6 below, basic sensors are used in combination often with some controls or processors to form stimulus detectors. Arrays of stimulus detectors are used to identify stimulus states 220. The stimulus states 220 are used as input to determine which particular video production rules, macro, micro and global to apply in a given situation.

In this matching embodiment 200, the results of the macro rule matching 205 are also supplied to the micro rule matching 210 to assist in defining the best micro rules to apply for video production. Both the output from the macro rule matching and the micro rule matching as well as the global rules are provided to the final decision making process routine 215. The final decision routine 215 completes the selection of the rules, after which, application of the video production rules can be made and a final layout configured for production 225.

Referring to FIG. 3A, in another embodiment, the macro rules are grouped or classified into scenarios in order to make the selection process, the selection of the macro video production rules to apply in a given situation, simpler and more efficient. When the video production enters the step of determining which macro rules to apply 305, the system looks to determine what video conferencing scenario is occurring. In this particular example, the macro rules are organized into three video conferencing site scenarios: (i) Far site talking only and near site listening 310, (ii) Near and far site talking discussion 315, and (iii) near site talking only and far site listening 320. A number of other possible video conferencing scenarios may be used in addition to the three enumerated, for example, near and far sites silent, near site presenter-far site noise. Once the video conferencing scenario determination is made, 305, the macro rules grouped or associated with the particular scenario are used. In this embodiment, stimulus information and room analytics may be used to further refine the macro rules to be used within the scenario grouped macro rules. In this way, decision tree type logic is followed to decide what macro rules to apply in a given situation.

Similarly FIG. 3B shows a decision tree type logic to determine which micro rules to apply to a given room state or mode 330. In certain embodiments, modes of operation within a room are used to categorize and apply micro rules. The room stimulus or analytics correlate to or are used to determine the mode of operation in a particular room. In this embodiment, the micro rules are grouped or classified into six states or modes, (i) Establishing 335, (ii) Silent 340, (iii) Talker 345, (iv) Presenter 350, (v) Two speaker 355, and (vi) Other 360. Different sets or subsets of micro rules apply to each mode of operation. At least one set of micro rules are assigned to each of the six states or modes.

For example, the establishing mode 335 correlates to situations in which an establishing shot would be appropriate for a produced video. An establishing shot is usually the first shot of a new scene, designed to show the audience where the action is taking place. It is usually a very wide shot or extreme wide shot. An establishing shot in filmmaking and television production sets up, or establishes the context for a scene by showing the relationship between its important figures and objects. Establishing mode 335 is appropriate when the system if first initialized in a room, a transition is occurring, or perhaps when a presenter has completed a presentation and is walking away. The micro rules for producing an establishing shot video production are assigned to the establishing mode 335. Room analytics or stimulus can be used to further refine the micro rules within a state or mode, such as within the establishing mode 335.

When a room is silent based on stimulus information or basic sensor data, the silent mode 340 is invoked. The system analyzes sensor data to determine whether room sound is below a certain threshold, is only background sound, or is not emanating from people. Once a silent room is sensed, micro rules tailored to a silent room are invoked. With regard to the silent mode 340, the micro rules grouped within this mode would dictate for example showing the whole room, larger view room pictures, panoramic views or panning across portions of the room.

With regard to the talker mode 345 or single talker, the micro rules would provide for the camera's tracking the person talking and the produced video focusing on the speaker and following the talker's movements. The system operates in talker mode when it senses that someone is speaking and "has the floor." However, when someone has been speaking for more than a discussion time period, the system converts that individual into a presenter and shifts into presenter mode. For example, when the near side talker talks continuously for more than a discussion time period (e.g. 2 minutes), that person becomes labeled a "presenter" by the automated system. The system also focuses on movement and speakers standing. Preference is given by the system micro rules to speakers standing over those seated. The focus is on the standing speaker rather than switching to another person or location in the room.

The presenter mode 350 would be entered after a single talker has spoken for longer than the discussion time period or if the system were manually set to the presenter mode. The presenter's video is generally produced and streamed as full screen video. The system remains in presenter mode until the system, through the room analytics, determines that there is another talking, a talker. If someone is designated a presenter and is standing, preference will be given to maintaining that presenter speaker as the focus even if other people talk. If the presenter is standing, a longer period of time is required of another speaker before the system will switch to single speaker mode and change its focus to the new speaker. It is assumed that the person standing will continue to hold the floor.

The micro rules for presenter mode 350 are similar to the single talker mode 345 in that the speaker would generally be tracked and focused upon, however, presenter breaks are introduced. Every so often a presenter break is introduced, and the layout switches to showing the room, a panoramic view, portions of the room, or the local audience. In this way, the produced video breaks from the constant focus on the presenter. These pauses in focusing on the presenter ("look aways") or breaks may involve shifting to a full view without the presenter being shown (temporarily). Presenter breaks occur based on a selected presenter break time period, for example 90 seconds or 2 minutes of speech. In some embodiments, the longer a presenter speaks the longer and more often the system goes to presenter breaks and moves to full screen views away from the presenter. In this manner, the audience reaction to the speaker can be shown. In particular, while in presenter break mode, an audience view may be presented overlaid (in a panoramic strip) on the presenter view. Thus, in some embodiments, an audience view is shown during the presenter break. While in presenter mode, for as long as a presenter is talking (and the system remains in presenter mode), the audience is shown on the video for a short period of time an audience view time period (e.g. ten seconds) every presenter break (e.g. two minutes). For example, the audience can be shown for ten seconds with a panoramic strip or otherwise showing all or portions of the room.

Two speaker mode 355 is entered when there are two individuals within the same room that are speaking. In this instance, generally a split screen or a single view of both speakers is desirable. With regard to the two speaker mode 355, the micro rules guide the video production system to create views which include both speakers, either in a single camera view or positioned facing each other on the produced video. The two speaker video production micro rules will be described in greater detail below.

If the activity in the room cannot be classified into one of the five modes of operation it can be classified as 'other 360' and a set of micro rules applicable to miscellaneous operational modes can be used. The other 360 mode will accommodate those room states which occur infrequently or those that cannot be easily classified. In some embodiments, other 360 mode will have a set of micro rules and a decision tree on which micro rules apply to given the room analytics or stimulus.

Referring to FIG. 3C, in some embodiments all the global rules are reviewed and applied by the video production system as appropriate. In yet other embodiments, the global rules are grouped or classified and only a subset are reviewed for application in a given situation 370. Ultimately, final decisions are made about which rules to apply 380. In this process rules which are contradictory or conflicting must be arbitraged or mitigated to reach a final set of production rules. The final set of production rules, macro, micro and global applied, define the layout for the video production. Typically, the macro rules are processed first and help define the micro rules so that there is some uniformity and avoidance of conflict between the macro and micro rules and the global rules supersede or override the micro and macro rules. The final layout of the video composition 380 is then used to process the camera views from the room and produce a director quality final video for streaming.

Figure 4:
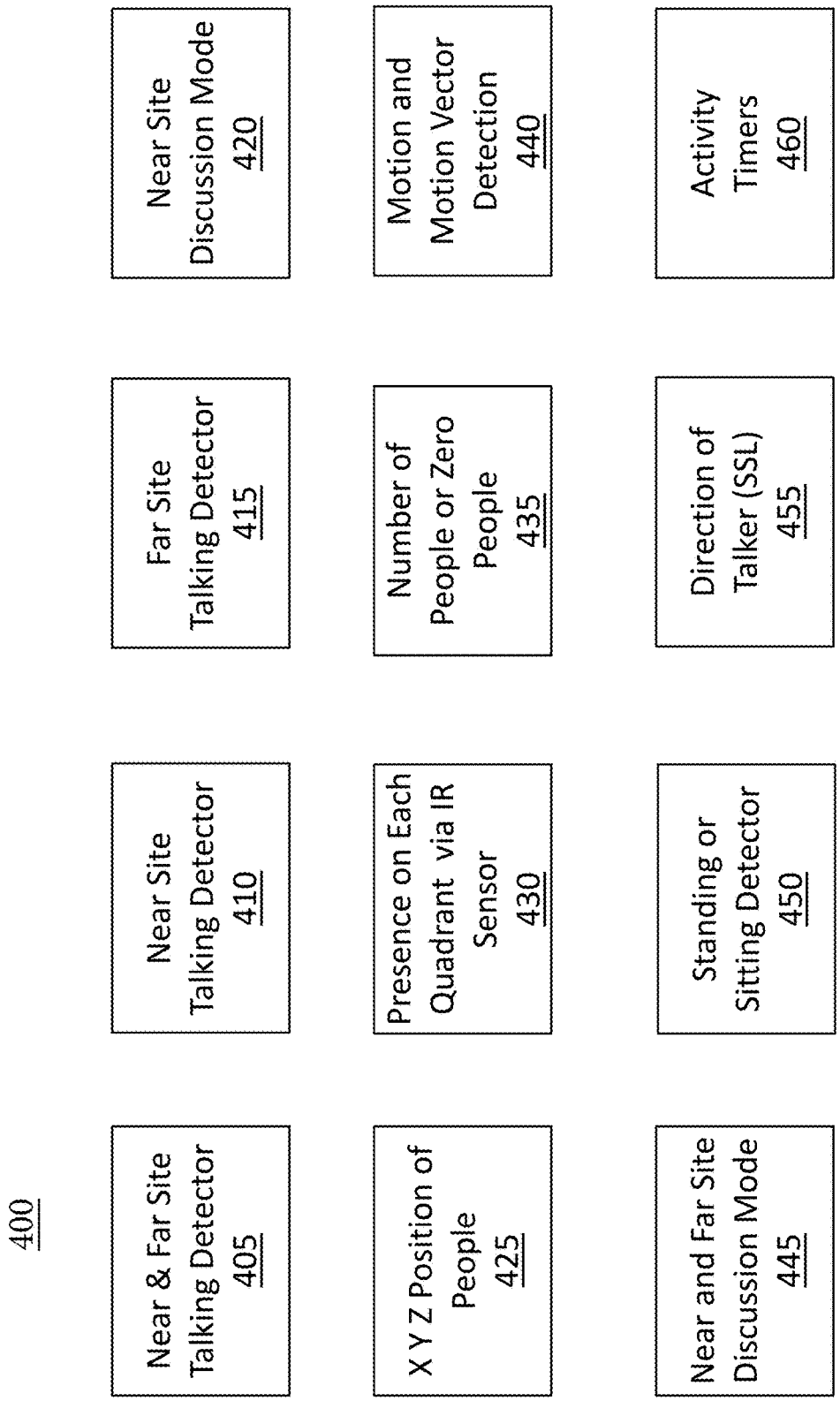
FIG. 4 shows the array of stimulus detectors.

Referring generally to FIG. 4, sensors are deployed to obtain data for use in higher level stimulus determinations. It is desirable to have various stimulus information available for video production including, for example, far side audio energy and/or speech flag, near side active speaker horizontal position in the frame, motion detection (particularly in the area covered by the panoramic strip), and time.

FIG. 4 shows an array of stimulus detectors 400 used to determine stimulus states and/or stimulus information for use by the automatic video production system. An array of twelve exemplary detectors are shown for use in the decision making process to decide which macro and micro rules will govern a particular situation. More or less detectors may be used dependent upon the quality of the final video production desired. The twelve identified are:

(i) near and far site talking detector 405,
(ii) near site talking detector 410,
(iii) far site talking detector 415,
(iv) near site discussion mode 420,
(v) x y z position of people 425,
(vi) presence on each quadrant via IP sensor 430,
(vii) number of people or no people 435,
(viii) motion and motion vector detection 440,
(ix) near and far site discussion mode 445,
(x) standing or sitting detector 450,
(xi) direction of talker (SSL) 455,
(xii) activity timers 460.

A variety of specific sensors and software may be used alone or in combination to effect the stimulus detectors identified and others. While in alternative embodiments a limited number of sensors with a limited amount of processing may be used to determine basic room analytics, more robust embodiments use an array of detectors such as those shown in FIG. 4 to develop stimulus information. Specific sensor and detector systems for performing these functions are known in the art. Some examples of sensors are temperature sensors, near people presence 6', near people presence 20', and light sensors. $CO_2$ and infrared raw sensor data is used by various detectors such as stimulus detectors which analyze data to detect certain outcomes. Some detectors derive information from the video image such as motion, motion in a certain area, motion vectors, head and shoulder detection, face detection with eyes, nose and mouth, face orientation—front, left, right.

The stimulus information from the array of detectors is used as input into the decision making or decision tree process to determine which macro and micro rules to apply to a given situation. More particularly, the stimulus information gathered from the detectors can be used to classify which of the three video conferencing scenario applies and/or which of the six is the current mode of operation for the near site room. The stimulus information may also be used to assist in the application of global rules.

Figure 3:
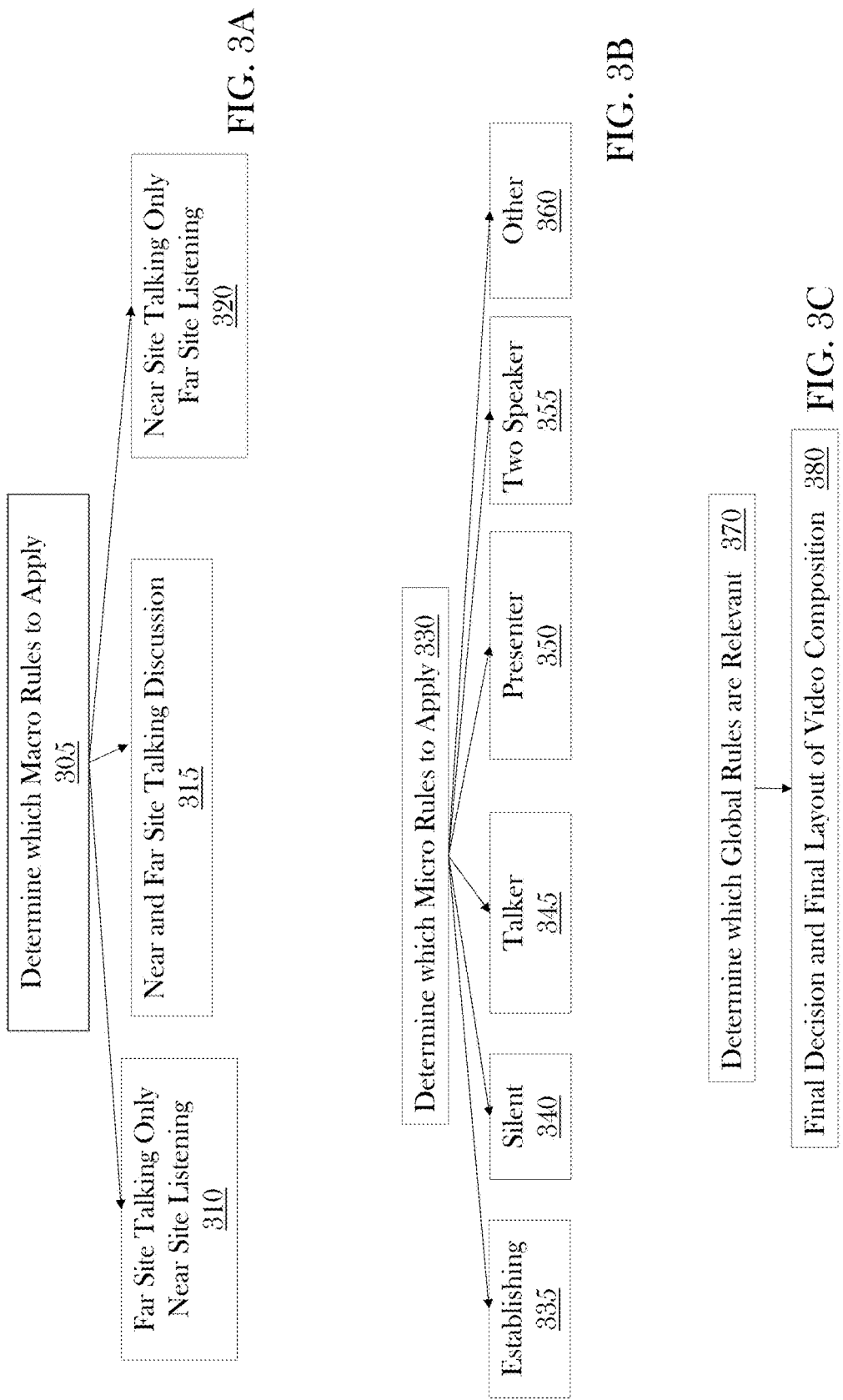
FIG. 3A-3C show the decision making structure for deciding macro rule application.
Figure 5:
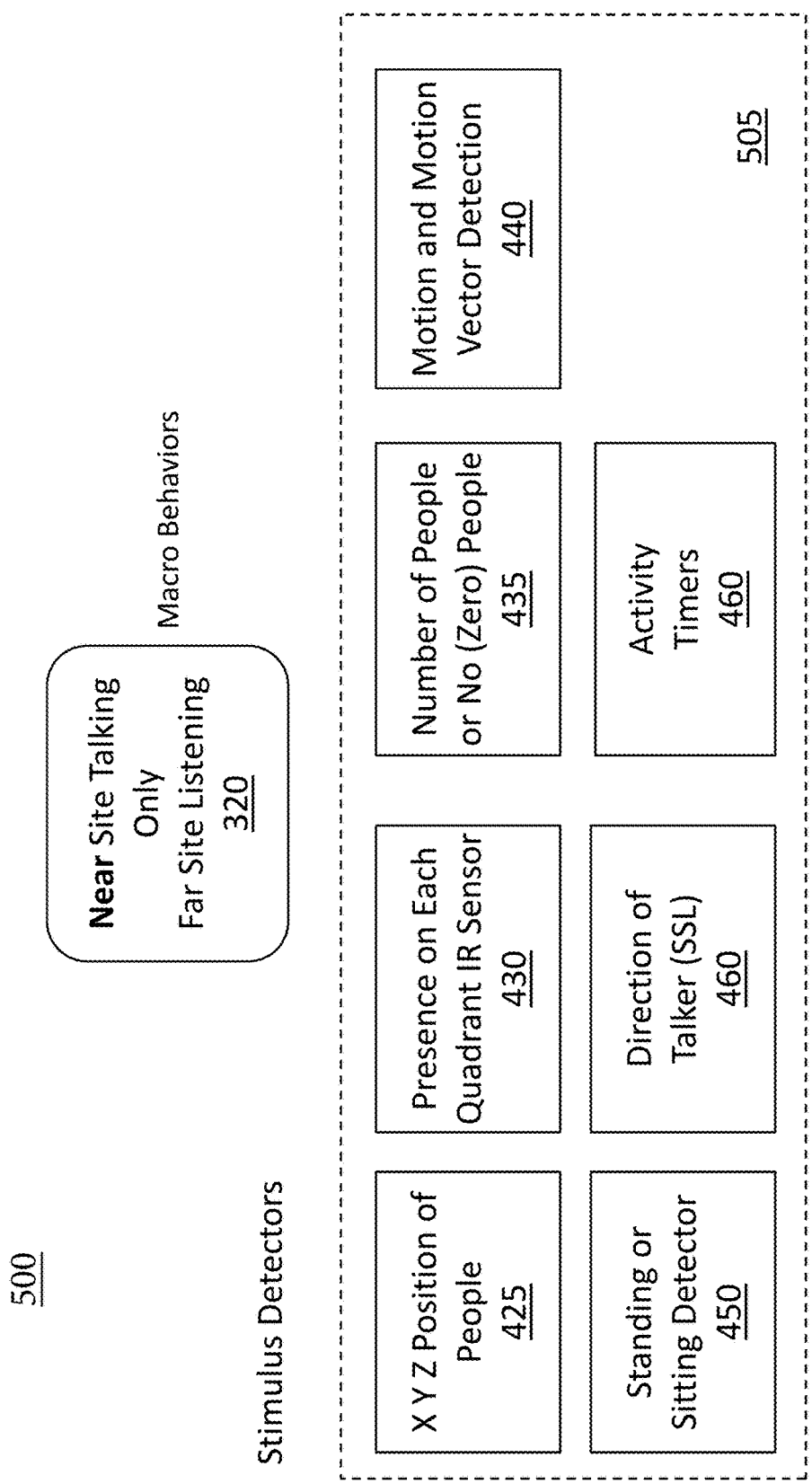
FIG. 5 shows the macro behaviors for near site talking only and far site learning.

Referring to FIG. 5, the stimulus information gathered from the set seven stimulus detectors shown 505 is used to classify 500 the video conferencing scenario entitled near site talking only and far site listening 320. As shown in FIG. 3, the classification among video conferencing scenarios assists with the determination of which macro rules to apply in a given situation. In the embodiment shown in FIG. 5 the classification 500 is performed based on the information derived from the set of seven stimulus detectors 505. Input from each of the seven detectors is received and analyzed as a whole to make the classification 500.

Figure 6:
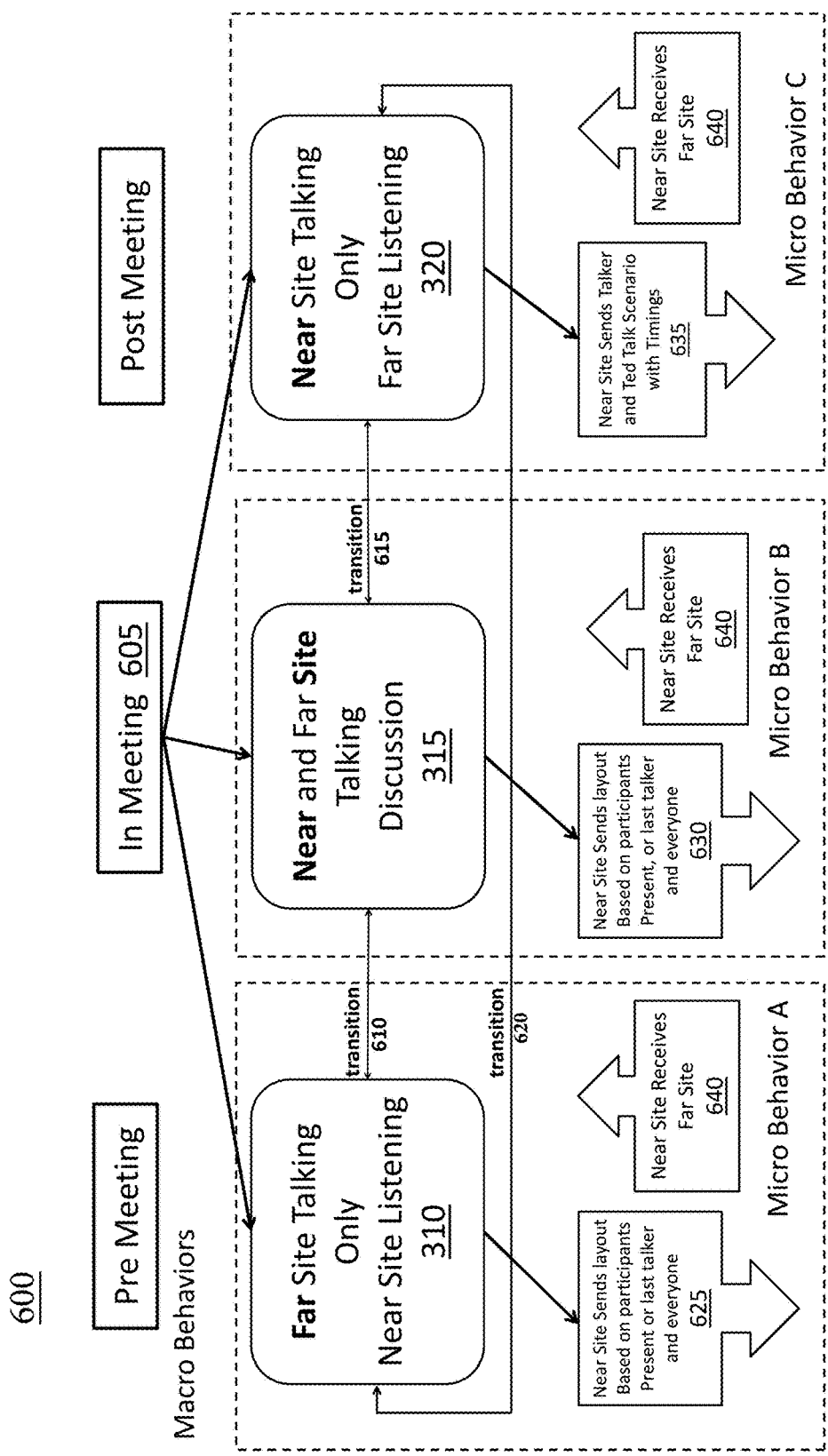
FIG. 6 shows in-meeting macro behaviors.

FIG. 6 is a visual depiction of the automatic video production system in operation. FIG. 6 shows at least three levels of system processing, meeting existence, video conference scenario classification and application of rules for a transmission. When a meeting is occurring 605 and a video conference is in session, a classification is made of the conferencing activities into one of the three video conference scenarios 310, 315, 320 (see FIG. 3A). This classification is made by the system using stimulus information received from an array of stimulus detectors 400 in a manner shown in FIG. 5. During the video conference call, the video scenario will, from time to time transition from one scenario to another 310, 315, 320. This transition is shown by transition arrows 610, 615 and 620 shown in FIG. 6. The system is able to transition from any one of the three classifications 310, 315, 320 to any other.

In one embodiment, once this classification is determined, the system will have a set of macro video production rules assigned to the classification that it will use in its decision making process for video production. See FIG. 3A. Following the classification, the system then uses the stimulus information related to the near site detectors to identify a set of micro rules. In one embodiment, the system uses the stimulus information, to determine a state or mode of operation for the near site room (see for example FIG. 3B, 335, 340, 345, 350, 355, 360) and uses the set of micro rules associated with the particular room state or mode.

Generally, decisions on video layouts are made locally within a room and globally when a room is in a call with a far site or sites. In some embodiments, a video layout is be determined first by decisions on a macro level then by decisions made on a micro level within the macro level state. Once a video conference scenario is determined, a macro level state is ascertained. Then room modes are used to determine which set of micro rules to appl. Global rules are applied as needed and can supersede the macro and micro rules. In some embodiments, there are global rules applicable to both macro level video scenarios and micro level room modes. Finally, macro level decisions typically override micro level states FIG. 6, in the lower or third level, describes some exemplary layouts for transmission that are arrived at after a final decision making process step 215 arbitrates between the set of macro, set of micro and global rules applied. FIG. 6 depicts three different layouts for transmission: A) near site send layout based on participants present or last talker and everyone 625, B) near site sends layout based on participants present, or last talk and everyone 630, C) near site sends talker and Ted Talk scenario with timings 635.

FIG. 6 also shows that the near site receives video and data from the far site in each of the three scenarios 640.

Video Production Rules

With regard to video production rules, in some embodiments, the applicable macro rules are applied first, followed by the applicable micro rules and finally, global rules are applied. Certain macro rules are applied based upon the current video conferencing scenario. Certain micro rules are applied based on a determination of the stimulus states. Finally, global rules are applied superseding the macro and micro rules as necessary.

Some examples of video production rules which may be included in an automatic video production system include:
(a) Provide proper headroom in layout when framing,
(b) Use Rule of Thirds for framing,
(c) Provide looking space in layout when still or moving,
(d) Only show room areas where people are present,
(e) Allow for sitting or standing individuals,
(f) Zoom in when appropriate,
(g) Show panoramic strip only when it does not cut important parts of the frame,
(h) Focus on the talkers but provide establishing shot every so often,
(i) Active speaker view of two talkers side-by-side,
(j) Framing of multiple talkers,
(k) Sensing people x-y-z position for use in framing,
(l) Eliminating empty space in panoramic strip view,
(m) Centering people in room views or panoramic strip view,
(n) Not showing the establishing shot when the active speaker view already covers all people in the room, and
(o) Allowing an around the room 'surround pan' using the remote control left and right.

Many other rules will be apparent to those of skill in the art of video production.

Subsets of the video production rules are related to certain features or aspects of the automatic video production system. Most of these subset of video production rules relate to the micro rules and activity at one site, namely near site room activity. The subsets of micro rules for specific features include for example:
(i) a uniform set of near site automatic video production rules for all conference calls whenever possible,
(ii) establishing shot rules,
(iii) not obstructing the view of the primary speaker on the layout as well as detecting where people are in a room and properly framing the participants.

(iv) silent rule set,
(v) new talker rule set,
(vi) presenter rule set,
(vii) no thrash rule set (generally part of global rule set),
(viii) Single Field of View Rules,
(ix) Two talker rule set.

Many of these micro rule sets are described below. Global rules may override other rules, some examples of global rules are:
(a) Once establishing shot is showing, it should stay up for at least x seconds;
(b) If establishing shot is not showing, it should stay off for at least y seconds; and
(c) Don't show establishing shot if it covers an individual's body or head.

In one embodiment, the focus is on active speaker views and establishing shots. In this embodiment, video rules exist to provide views or layouts for active speaker views and establishing shots. The rules also provide for transitioning between the two layouts. The transition between active speaker and establishing shot can provide the viewer useful information (e.g. who is in the room) and be a pleasant experience, not a distraction. The transitions can be separate video layouts which are streamed and given a limited amount of screen time, a transition time (e.g. 5 seconds). As is seen from this embodiment, not all rules must be used in a video production system. Subsets or excerpts of the rules may be used to accomplish the desired purpose.

Following are discussed a number of examples of video production rules. A description of their application and usefulness accompanies each video production rule.

Video Production Rule 1 Treat the Near Site Automatic Video Production the Same for All Conference Calls It desirable in most embodiments to treat all near site video processing the same. This reduces the need to have custom software for given sites and avoids special production rules based on the number of sites in a video conference. In this manner, the video production rules for each near site are generally consistent and can be uniformly applied.

Video Production Rule 2 Establishing Shot

In one embodiment, the video conference scenario instructs as to when establishing shots should be used. For example, the video production system shows establishing shots when:
(i) far side is talking and near side is listening;
(ii) both far side and near side are not talking, and
(iii) near side is muted.

This video conference scenario based decision process is typically handled by the macro rules. Once the macro rules decide that an establishing shot is proper, then micro rules related to establishing shots are used. The establishing shot micro rules provide the refined level of detail for deciding which particular type of shot and camera angle to be used in the video layout.

The establishing shot micro rules make available several different types of establishing shots for the system to use including (i) a single panoramic strip, (ii) stacked strips (two or three stacked strips), (iii) panning around the room smoothly (e.g. full screen in a period of under a minute), (iv) panning around the room in six to eight discrete steps (e.g. in a period under a minute), and (v) a single strip by itself centered in the view (e.g. 16×9 view). The establishing shot micro rules inform the automatic system on which of the various types of establishing shot to utilize. Different establishing shots are preferred or are more applicable in particular situations. For example, if there are only two individuals sitting close together in a room, panning the room is a less than ideal solution and stacking strips is not necessary.

In the instance in which only a few individuals are seated closely together in a room, the establishing shot micro rules would choose full screen or single strip by itself In some embodiments, accordion strips and strips that eliminate areas of lesser importance in the room are used. Panoramic 360 degree video strips can be accordioned and modified to eliminate displays of areas of the room with no individuals. This allows for greater zooming and better views of individuals. The processing of video for an accordion appearance and/or the elimination of regions of less interest is described in U.S. Pat. No. 8,773,498 assigned to Polycom, Inc. which is hereby incorporated herein by reference in its entirety. Strips with snapshots of individuals, strips with elimination of areas of lesser interest and the accordion strips can be substituted for other panoramic strips described herein.

These specialty strips, e.g. accordion, can be stacked for room views.

Video Production Rule 3 Don't Obstruct View of Speaker with Strip

An active talker set of micro rules (or subset of micro rules) may be used by the system whenever a room has a single speaker actively talking. Thus, an active talker subset of micro rules can be put into use when the system is in the single talker mode or the presenter mode.

One subset of the micro rules for video production relate to not obstructing the view of the primary speaker on the layout. This subset of rules is used when the active talker rules are in effect and an obstruction of the active talker may occur.

When there is an active talker in a room, it is often desirable to place a panoramic strip view (view from a 360 degree camera) at the top of the screen. This provides a useful and aesthetically pleasing layout for the viewers. However problems arise when the on-screen view of the active talker is obstructed or when the active talker is not properly framed. In one embodiment, a separate micro rule set exists for preventing obstruction of and active talker, and a separate rule set exists for properly framing the active talker in the panoramic view.

Typically, sound source localization (SSL) is used by the system to determine where a talker is located in the room. The system then frames the camera to where the talker is. This is the "Active Talker." A problem arises if the system detects an obstruction of the active talker view.

With reference to FIG. 7A, with regard to the micro rules related to avoiding obstructing the active talker, typically the default position is for the 360 degree panoramic strip to be positioned at the top part of the layout, across the top. This particular view of an active talker with top strip is shown in FIG. 7A. Generally, when people are sitting, the panoramic strip can easily appear on top of the active speaker video. If any motion in the active talker window is detected at the top of the screen (where the 360 degree panoramic strip would normally be placed), obstruction of the active talker can take place. See for example FIG. 7B, in which the active talker stands and the panoramic strip appears on top of the active talker's face.

Figure 7F:
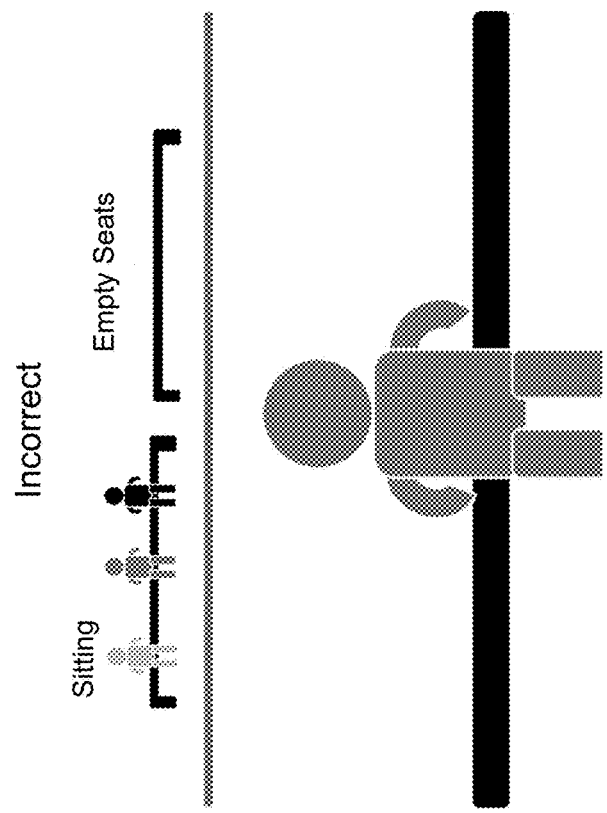
Figure 7E:
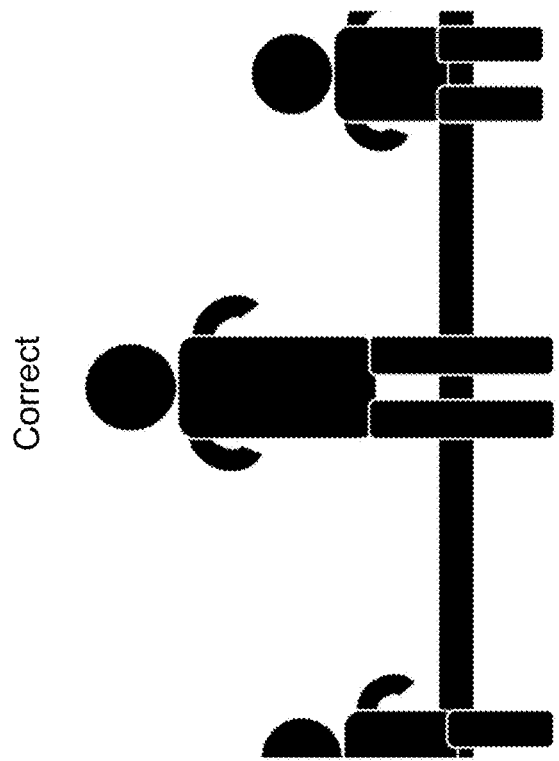

Referring generally to FIG. 7C through FIG. 7E, the system's avoiding obstruction micro rules provide guidance for avoiding the obstruction of the active talker by any room view or, in this case, the 360 degree panoramic view. In particular, the system avoiding obstruction micro rules will provide for either:

i. placing the strip at the bottom of the layout (FIG. 7C)
ii. placing the strip at the top of the layout and shifting the active talker down (FIG. 7D)
iii. or not place the strip on the layout at all (full screen active talker). (FIG. 7E).

With reference to FIG. 7C, when the active talker stands or otherwise fills the top part of the video layout, the avoiding obstruction micro rules accommodate for the movement. In the instance shown in FIG. 7C, when the active talker stands, the system stimulus or room analytics detects the motion in the top part of the layout and places the panoramic strip at the bottom of the layout. By moving the panoramic strip, obstruction of the active talker is avoided.

With reference to FIG. 7D, an alternative resolution of an active talker obstruction is depicted. In this instance, when the active talker stands, the system detects motion in the top part of the screen and moves or pushes the view of the active talker lower on the layout. In this case, the panoramic strip either remains at the top of the layout or is placed on the top of the layout. Generally, this solution is used when the panoramic strip is already at the top of the layout and can remain at the top of the layout by shifting the active talker view lower in order to avoid obstructing the view of the active talker. This particular solution helps avoid shifting the panoramic view from top of layout to bottom of layout which can be distracting to the viewer.

Finally in FIG. 7E, in another alternative solution to the obstruction problem, the micro rules for avoiding obstruction can change the layout to a whole screen layout of the active talker. By removing the panoramic strip or other room view, obstruction is eliminated. Thus, for example, when the active talker stands, the system detects motion in the top area of the layout and does not display the panoramic strip.

The avoiding micro rules work in conjunction with the other micro rules, macro rules and global rules to make final layout placements. Again, the arbitrator between the rules is the final decision process 215. Which of the three solutions is chosen, (i) strip at bottom, (ii) move active talker frame, or (iii) full screen active talker is dependent on the room analytics or stimulus and interaction with other rules. For example, if the automatic video system is in the presenter mode and was showing the strip on a presenter break, the system would shift back to full screen active talker to be most in line with expected presenter mode operation. In another example, if the strip had recently been placed at the top of the layout (less than the thrash time), the no thrash global rule would dictate leaving the strip in place at the top of the layout and shifting the active talker view. If (a) the talker was not determined to be a presenter, (b) the no thrash rule was not in effect, and (c) the active talker had stood up in the recent past, the system would make use of the solution of placing the strip at the bottom of the layout.

Another set of micro rules relates to detecting where people are in a room and properly framing the participants in a layout. This is applicable for full screen as well as panoramic views of participants or general audience members. Therefore, in addition to where on the layout and when a panoramic strip should be placed on the video layout, the micro rules for use of the panoramic strip provide guidelines for framing the participants in the panoramic strip view. The micro rules provide for framing the participants or audience for aesthetic reasons and to improve visibility of the audience or participants.

While the framing of the participants is described primarily with reference to a panoramic view, the framing applies equally to any view of videoconference participants or an audience. The participant view can be framed in a manner that centers the participants in the layout. This is primarily an issue of left and right framing. Also, the panoramic view can be framed to accommodate whether the participants are all sitting or all standing, which is primarily an issue of top and bottom framing. Using stimulus information or basic room analytics received from motion detection, motion sensors, SSL and the like, the system detects where people are in the room and adjusts the panoramic video to place those people into the center of the of the strip and center of the layout.

In one embodiment, the micro rules related to placing participants on camera provides for starting the view or panoramic strip where there are no people in the room and then clusters people in the middle of the view or strip. The point is to avoid displaying a participant view or panoramic strip where all the participants are huddled to one side as shown in FIG. 7F. Various methods may be used to determine the room locations, left and right, that are without participants.

Figure 7G:
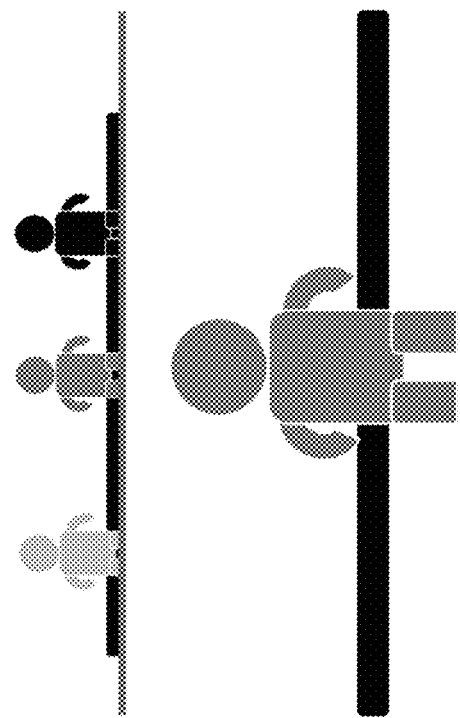

As can be seen in FIG. 7G, the system determines where the participants are located in the room in a left right orientation and centers the participants in the middle of the layout creating a more balanced and aesthetically pleasing framing for the panoramic strip. To perform this step, the system detects where the participants begin and end in the 360 degree view. Following this step those participants are centered in the 360 degree panoramic strip view.

Figure 7H:
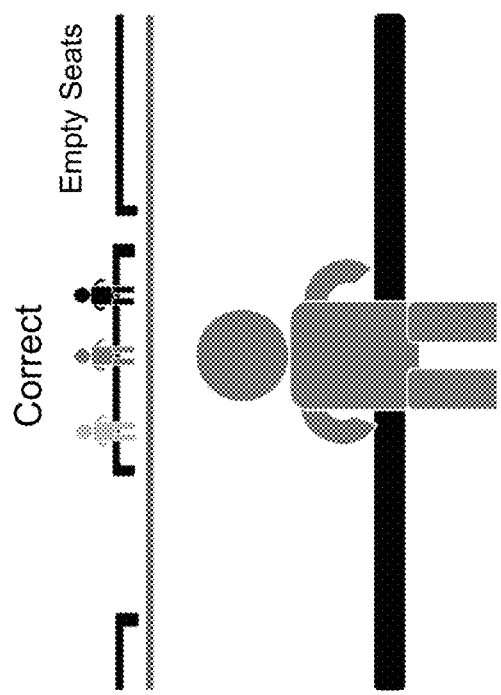

In addition to centering participants on the strip layout, the system can also focus in on participants and eliminate the empty space or empty seats in the view. Specifically, after centering the people in the middle of the field of view, the system can use motion detection and people finding to determine the empty space in the room. The system can then zoom the panorama view to eliminate the empty space and make the people larger and easier to see. Thus, FIG. 7H shows a layout created after a two-step process of first centering the participants and then zooming. Again, while framing of the participants and focusing on the participants is described with regard to panoramic views, the methodology is equally applicable to any room view including full screen.

Figure 7I:
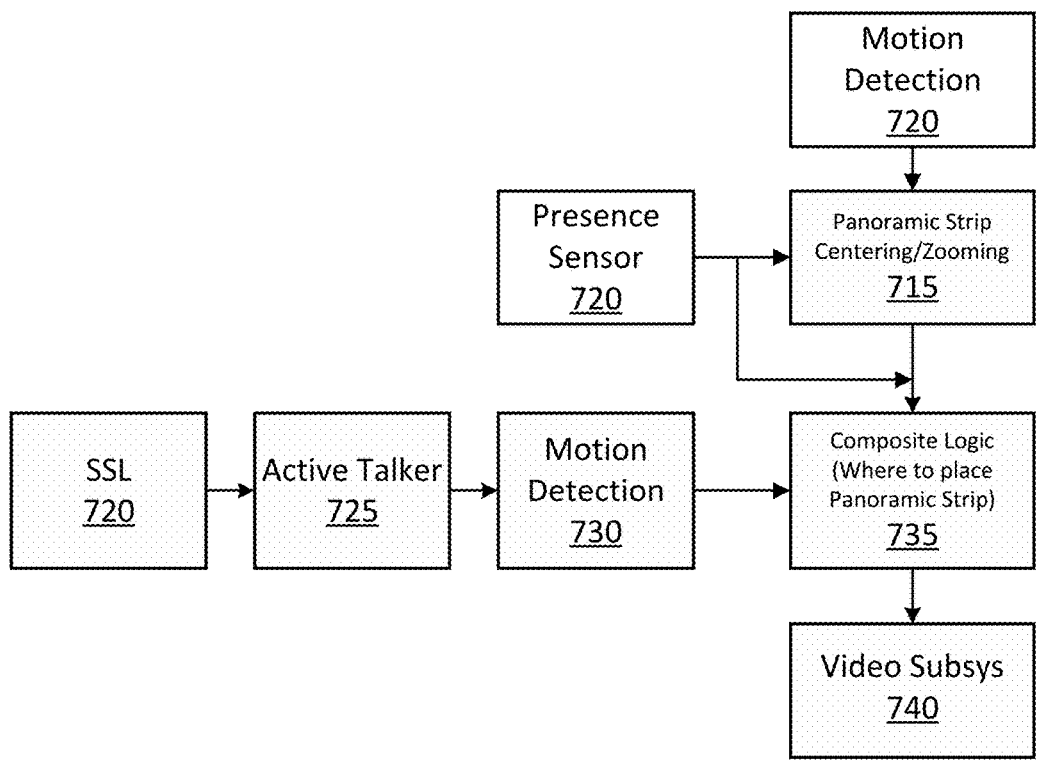

FIG. 7I is a logic flow diagram of one embodiment of the automatic handling of the panoramic strip by the video production system. The logic is based in two parts: people centering/zooming and compositing for screen. The programming for the layout of the panoramic strip may be executed in one or more processors located in the video production system (e.g. MCU).

Referring to FIG. 7I the logic process for people centering and zooming includes motion detection 705, presence sensor 710 followed by panoramic strip processing 715. Strip processing 715 can include placing detected people towards the center of the strip, while leaving any empty views to the sides. Strip processing 715 can include ensuring there are no empty spaces between displayed people. Strip processing 715 can also include that no empty spaces are displayed. The resulting information from these steps is then fed into the composting logic step 735. Both centering and zooming are conducted by the steps of this process making the strip ready to place in a video layout. The automatic video production system uses data from motion detection 705 and presence sensors systems 710 to determine where individuals are in the room. The presence sensors 710 provide the system the distance of an object. This may be a distance from the camera or a distance from a reference point, such as the center of the room. Various known sensors may be used. The presence sensors 710 are also used to remove motion noise.

Motion noise may come from a variety of distractions, for example, trees in the background, people walking outside the conference room, or people on the other side of a glass wall or window.

Once motion noise is removed, a region of interest is determined by the system. The cameras are then focused upon or digital data video is gathered for the region of interest. The region of interest (based upon the motion 705 and presence 710) is then centered in the panoramic view as discussed above with reference to FIG. 7A through FIG. 7H.

Still referring to FIG. 7I, based on how many people are in the room and how close together they are sitting, the strip of people can be zoomed in to fill the field of view with people. In the left right and zooming process, it is important to ensure individuals are not inadvertently "cut-out" of the picture.

The second part of the process is the compositing logic or where to place the strip in the layout. The input for the compositing process are Sound Source Localization (SSL) 720, active talker 725, motion detection 730 and presence sensor 710. The Sound Source Localization (SSL) 720 determines where the active talker is located in the room and centers that person in the field of view. The active talker switching 725 determines if the same person is still speaking and is the active talker. If the same person is not sufficiently speaking relative to other speakers in the room, then the active talker switching 725 makes a decision to switch to a different person as the active talker. Afterwards, SSL 720 info is received on the new active talker.

The motion detection 730 for compositing logic is concentrated on whether (in the larger field of view) there is movement in the room which will be obstructed by the strip. Often, since (a) the strip defaults to the top of the screen and (b) important movement is rare at heights below seats or tables, the concentration for motion detection 730 is for movement that may appear on the top of the layout. When motion detection 730 determines that there is movement in the video in the top part of the field of view, a determination is made as to whether that movement is from an individual, as opposed to a distraction. The presence sensors 710 are also used, as in the case of people centering, to determine if the motion is a person or a distraction. When it is determined that motion in the upper part of the view is a person, adjustments are made to the placement of the strip placement.

The compositing logic 735 determines where to place the panoramic strip in the video layout based on the input received from at least three sources: panoramic strip centering/zooming 735, presence sensor 710, and motion detection 730. The compositing logic rules that are followed for the creation of a layout include (but are not necessarily limited to):
  (i) If no person motion is detected at the top of the frame, the panoramic strip is overlaid on top of the active talker view at the top of the layout.
  (ii) If motion is detected at the top of the frame, the panoramic strip is overlaid on top of the active talker at the bottom of the layout or no strip is used (and active talker view is full screen).

Whether to place the strip at the bottom of the screen or to revert to a full view of the active talker is decided by the system based upon other video production rules (e.g. micro, macro and global). Following the processing of the compositing logic 735 the layout information is sent to other video production subsystems for further processing and final layout.

Referring generally to FIGS. 7J and 7K, another aspect or feature of the video production system related to the streaming of the panoramic strip is shown, namely, how and when the panorama strip is transmitted or sent to the far site. As shown in FIG. 7J, the panoramic strip can be sent onscreen with the normal video lines for display. Typically, this would be in video lines 1 through 244 and the panoramic view would be placed at the top of the screen.

Whether or not the final display layout includes the panoramic strip as part of the video to be shown the far site, the strip may be transmitted. In one embodiment, the strip is continuously transmitted or always transmitted. In this way, the strip is always and instantaneously available to be used as part of the layout. Thus, the composite strip is always present, but does not always appear in the layout to be displayed.

Normally, when the panoramic strip does appear in the layout for display it appears at top of the layout. However, as shown in FIG. 7K, the panoramic video can be located just off screen (in memory) at the bottom of the frame and transmitted or streamed. In the example shown in FIG. 7K, the panoramic view can be sent in the hidden video lines such as 1081-1325 rather than the visible video lines. This allows the panoramic video to be ready to be moved to the top of the video frame for viewing at any time. When the panoramic video is needed, it is placed at the top of the video layout or at the bottom of the layout. By having the panoramic strip located just off screen, the system shows less flicker and image thrash. Moving the panoramic video strip creates much less flicker and image thrash then turning the strip on and off, or sending and then not sending the panoramic strip. In sum, by sending the panoramic view in the hidden video lines, the view is always available for placement in the final video layout and display at the far site without creation of flicker or image thrash.

Video Production Rule 4 Silent Rule

Figure 8:
FIG. 8 shows Video Production Rule 4.

The system has a set of production rules which apply when a conference room is silent, as shown in FIG. 8. When the room is considered silent, a micro set of rules related for handing silent room mode are used. Basic sensors or stimulus detectors are used by the system to determine if a silent room is empty or simply listening. In the silent room determination, allowance is provided for a certain level of noise within a conference room such as shuffling paper, individual's moving and very short commentary. The system attempts to discern and then classify rooms into silent mode or a mode with one or more active speakers. More particularly, in one embodiment the system determines whether the silent room has one of the following configurations in order to apply production rules: empty, one individual, two individuals, all individuals within one camera view, and all individuals within two camera views. Armed with this information the system can apply more exacting micro rules to select an appropriate video layout.

When silent and empty the rules may select for example one of the following video layouts: empty room full view, a logo or sign, blank screen or text stating no participants. When possible, a single camera view is used to show all individuals in a room. When silent with one individual, that person is shown in a single camera view. When silent and two individuals, a determination is made about how many camera angles or views are needed. If able, the system will show both individuals in one camera view, if not, similar rules to the two talker mode may be used to show both individuals in the video layout. When there are a number of silent individuals in various location of a room the rules related to 360 degree views and panoramic strip are used to effectively present the silent room.

Video Production Rule 5 New Talker Rule

The system has a set of production rules which apply when there is a new talker. When the near site is talking for more than an interruption time period (set period of time (e.g. 5 seconds)), the video conferencing scenario will be classified as one which involves talking from the near site. This will invoke appropriate macro rules and then micro rules for the video production system. In most instances the video production system enters new talker mode and sends a new talker view full screen.

In one embodiment, when analysis of basic sensor data or stimulus information received shows that the near side has a new speaker talking, then the micro rules regarding new talker mode are placed in effect. Most often the new talker micro rules would show the active speaker view in full screen for at least the beginning portion of the speaker's talk.

Figure 9:
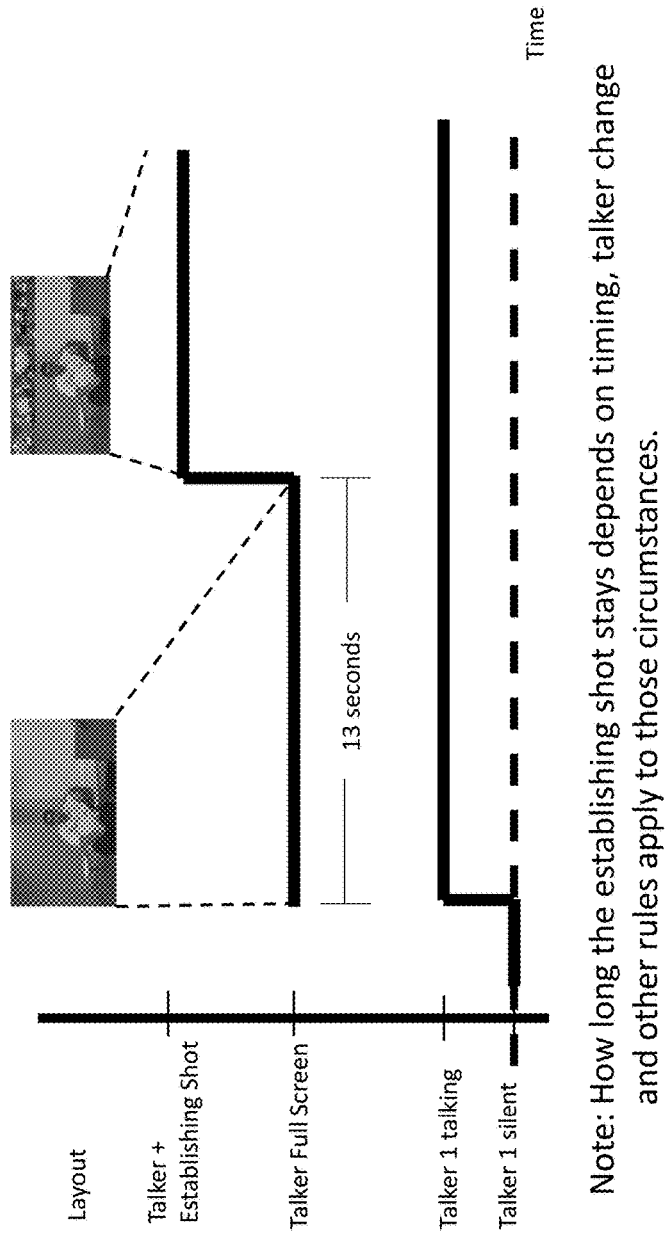
FIG. 9 shows Video Production Rule 5.

Referring to video production Rule 5, as illustrated in FIG. 9, while in talker mode, if a person talks for more than a brief time period (e.g. 13 seconds), the system sends a panoramic view along with the view of the speaker. In other words, the layout includes two parts, the single talker view and the panoramic view. FIG. 9 shows this transition of state from a layout showing only the speaker for a brief time period to a layout showing the speaker and a room view in accordance with Rule 5. The new state with the layout including the room view is shown for as long as the single person is speaking. If the speaker talks for a presenter's time period (e.g. 90 to 120 second), then the video production system will switch to presenter mode and micro rules associated with presenter mode will be implemented.

The default panoramic view is to place the panoramic strip on top. If the panoramic strip blocks the head of the person speaking in the view, then the panoramic strip is moved or placed on bottom.

When speakers change, sometimes the panoramic view is left on the video layout. If a new talker's location is less than a 40 degree angular difference from the previous talker's location than alternative rules are followed. Specifically, the view will follow to and center on the new talker and generally apply new talker rules, however if a panoramic strip view is on screen, it remains on the screen. The system leaves the panoramic strip view on screen to avoid distraction.

With regard to two speakers, see video production rules regarding two speakers discussed infra. In general, both people are placed in the video layout.

Video Production Rule 6 Presenter Rule

Figure 10:
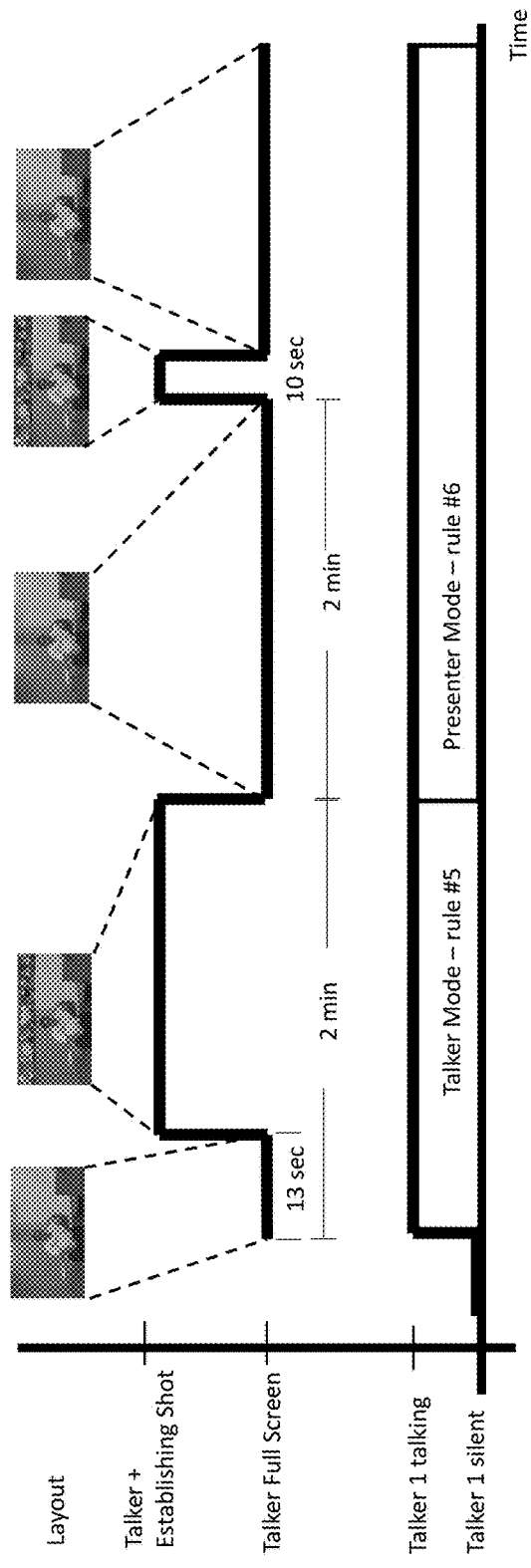
FIG. 10 shows Video Production Rule 6.

The system has a set of production rules which are applied when a person is detected to be presenting a speech or lecture, as shown in FIG. 10. A set of presenter micro rules are invoked when a single person at the near site has talked continuously for a presenter period of time (e.g. 90, 100, or 120 seconds). More particularly, the system switches from single talker mode to presenter mode and applies presenter micro rules when room analytics or stimulus determine that the talker has spoken uninterrupted for a presenter period of time.

Once in presenter mode, the system will remain in presenter mode until and unless the speaker is interrupted for more than an interruption period of time (e.g. 5, 8 or 10 seconds). While in the presenter mode the micro rules will guide the system to present a full screen layout of the presenter. This full screen layout will continue for a set period of time, the presenter view period (e.g. 90 seconds, 2 minutes), followed by a presenter break period (e.g. 8, 10 or 12 seconds) in which a room view will be overlaid onto the full screen view. The presenter break period is followed by a presenter period and then another presenter break and this pattern continues until the presenter finishes speaking.

Rule 6 of FIG. 10 depicts the changing state of the layout against a time line. Each of the time periods and transitions are shown in the state timing diagram. RULE FIG. 6 shows both a single talker mode and presenter mode.

During the initial time period of Rule 6 (See FIG. 10), there is silence. The silence or establishing micro rules may apply during the initial time period. At the beginning of the second time period, the system changes state to a single talker mode and displays a full screen single talker layout for the length of the talker time period, in this case 13 seconds. Following the talker time period (13 second full screen single talker), the system switches layouts to a single talker with a panoramic full room view. This is the single talker with room view time period. In this way other individuals in the room with the talker can be seen by the viewers.

After the talker speaks for a presenter time period (in this case two minutes), the system changes states again, this time to presenter mode. In the embodiment shown, the presenter mode micro rules provide for two minutes of time before a presenter break occurs. During the presenter break (which is ten seconds in this example), the video layout is changed to include a panoramic view of the room at the top of the video layout. Following the presenter break, the system returns the layout to the normal full screen layout used for presenters. Presenter breaks may occur from time to time depending upon the specific embodiment.

In some embodiment, presenter mode micro rules are applied when the system determine based on room analytics, that the same talker has spoken for a presenter time period.

In other embodiments, when the presenter speaks for a long time, the system periodically shows an establishing shot for the presenter break. In these embodiments, instead of overlaying a strip or room view, during the presenter break, the automated production rules of the system switches to establishing mode and establishing micro rules. The frequency and duration of the establishing shot may vary over time, for example, the longer the presenter speaks the longer the presenter breaks. In this algorithm, the length of the presenter breaks vary with the length of the presenter talking time. By switching to an establishing shot during presenter breaks, viewers can see the in-room participant's reaction to the presenter's presentation.

Video Production Rule 7—No Thrash Rule—Global Production Rule

Referring generally to RULE 7 (FIG. 11), rules exist in the system to avoid thrashing. The video layout should not change frequently as it is disturbing to the viewer and distracting. Generally, in video production it is best to avoid frequent changes or thrashing. Thrashing occurs when the video view or video layout are changed too often.

In some embodiments the systems automatic rules include either micro rules or global rules which are in place to avoid trashing.

In an embodiment depicted by RULE 7 (See FIG. 11), a general rule to avoid thrashing exists. The general rule is that no changes are made to the layout for at least a certain short period of time (e.g. 5 seconds), the thrashing time period. If the panoramic strip is on, it stays on for at least the thrashing time period (e.g. 5 seconds). If the panoramic strip is off, it stays off for at least the thrashing period (e.g. 5 seconds).

Figure 11:
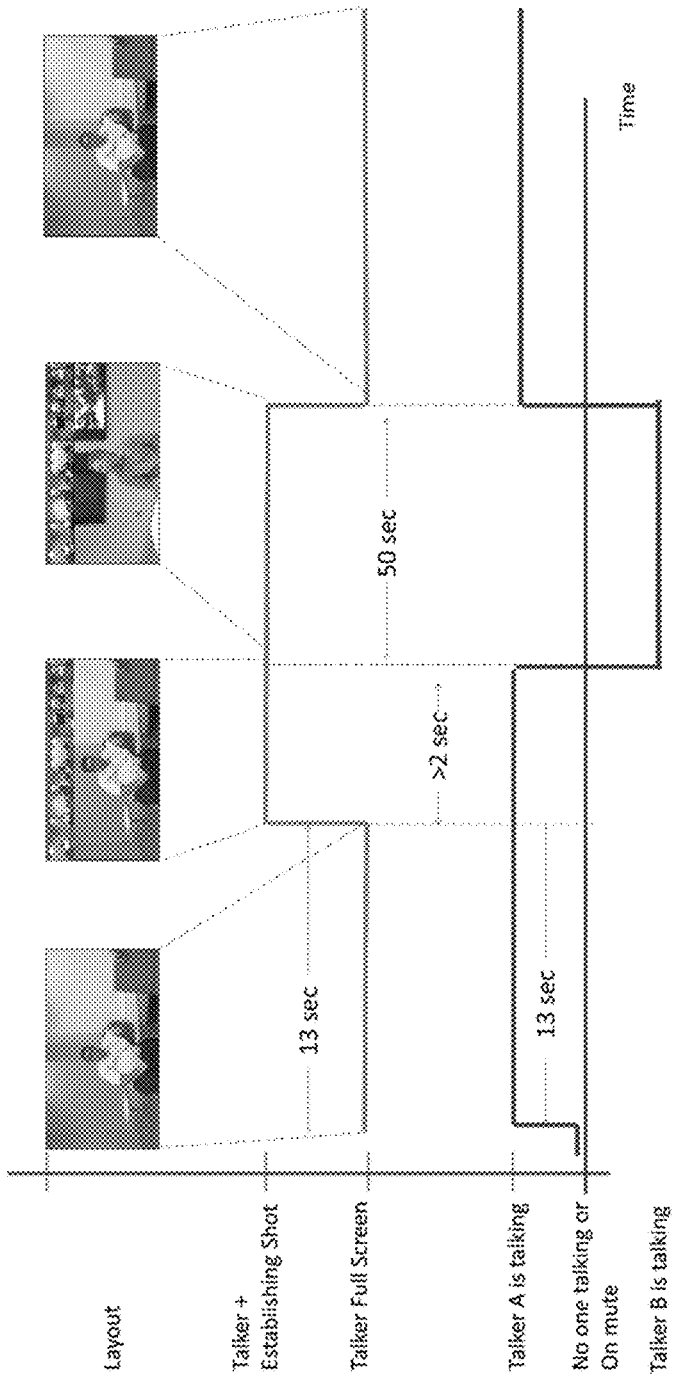
FIG. 11 shows Video Production Rule 7.

FIG. 11 is a state timing diagram showing changes in the state of operation of the automatic video production system in accordance with Rule 7. The diagram shows an initial silent time period followed by a change of state to single talker mode. The single talker mode continues for greater than 13 seconds. In this embodiment, the single talker micro rules dictate showing a panoramic strip view of the room after 13 seconds of single talker full display. Thus the layout changes to add the panoramic view at the top after 13 seconds.

As is shown, about two or three seconds following the switch to the layout with the panoramic view, the room analytics (or a stimulus arrays detection system) detect that the room changes from single talker mode to silent mode. Normally, the change in mode from single talker mode to silent mode would be immediately followed by a change in video layout to coincide with the change in mode. However, the anti-thrashing rule which requires that no layout changes are made within five seconds of any previous video layout change. Therefore, there is a two to three second delay before the video layout switches to a silent mode video layout.

Video Production Rule 8—Single Field of View Micro Rules

The system has a set of rules relating to use of a single field of view. In one embodiment of the video system, the preference is to use a single field of view when possible. In other words, displaying a single camera field of view showing all relevant activity in the room when appropriate.

When all the participants in a room are confined to a small area, a single field of view showing all participants is the preferred view. In this circumstance, the single field of view can be shown without showing the strip panoramic view and there is no need for using a stacked panoramic view of the room. This single field of view can be shown full screen whether the participants are talking or listening.

In one embodiment, the micro rules guide the system to a full screen layout when motion is detected in a continuous space and the area with the motion can fit into one camera view. The system is generally looking for motion that can fit into one 16×9 camera view.

In one embodiment, it is appropriate to use the single field of view without panoramic strips or other video under the following circumstances:
 (1) if there is only one person in the room;
 (2) if motion is detected in only one area or field of view (e.g. 40 degrees), (for example when two talkers are in same field of view) and data shows that no individuals are in the room outside the field of view.

In this room analytic analysis, the region of interest in the room for video capture is the single field of view with the one person or all persons in the room are captured within the one field of view.

Video Production Rule 9—Two Talker Rules

Depending on the embodiment, the system has various two talker rules which may be used. The following micro rules may apply if there are two speakers within the same room. If there is one speaker in one room (near site) and another speaker in another room (far site) than the macro rules related to discussion between sites would apply and be applied prior to the micro rules on two talkers.

In television productions, a director tries to use camera angles that make it look like the people onscreen are talking to each other. This is accomplished by making talker's faces point towards each other. This way they appear to be interacting with each other.

Figure 12B:
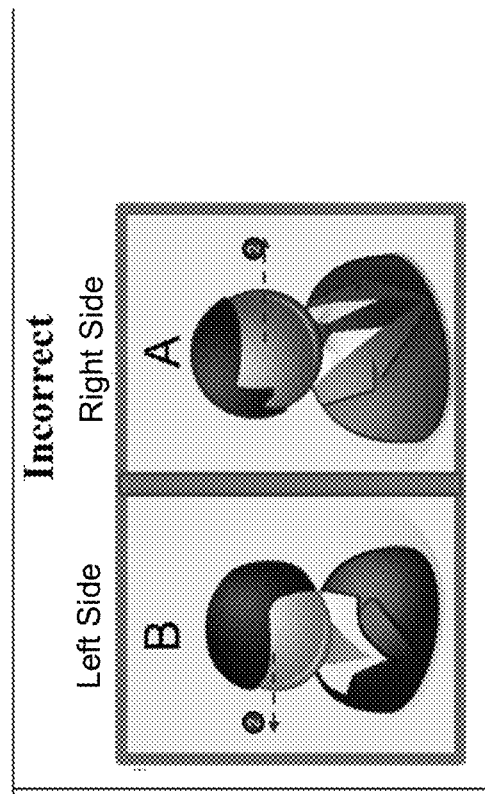
FIG. 12A-12O show various implementations of Video Production Rule 9, including compositing logic diagrams, steps in automatic framing or composing, and automatic composing of display with two active speakers.
Figure 12A:
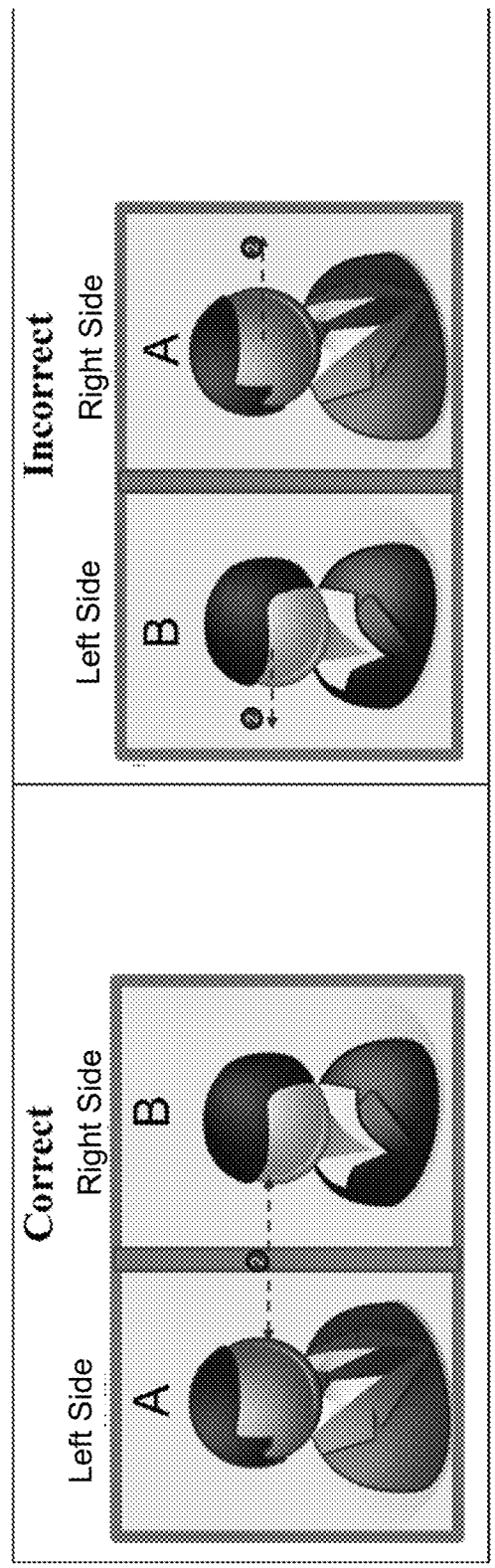

Referring to FIGS. 12A and 12B each shows two speakers on a video screen, one on the left and right sides of the video screens. In some embodiments there is a desire to have the speakers face each other to provide the viewer the appearance that the two speakers are talking to each other. FIG. 12A shows the improvement of the speakers facing each other rather than the arrangement in FIG. 12B where the speakers face away.

When two people in a room are talking, if they are close together, they may be both shown in one simple camera view. Otherwise, the video must be composed. To frame each person correctly and compose the video, various steps must be taken. Generally, as part of preparing the video for streaming or display, the composer would crop the image of the speakers, and compose them next to each other. A determination is often needed about which speaker will be displayed on the right of the screen and which will be displayed on the left. Determining which speaker should be on the right or left by is done by using geometry to decide which way each speaker would be facing in order for it to appear to the viewer of the video that the two speakers are talking to each other. This composing of the video results in a display where the two speakers appear to be facing each other.

Figure 12C:
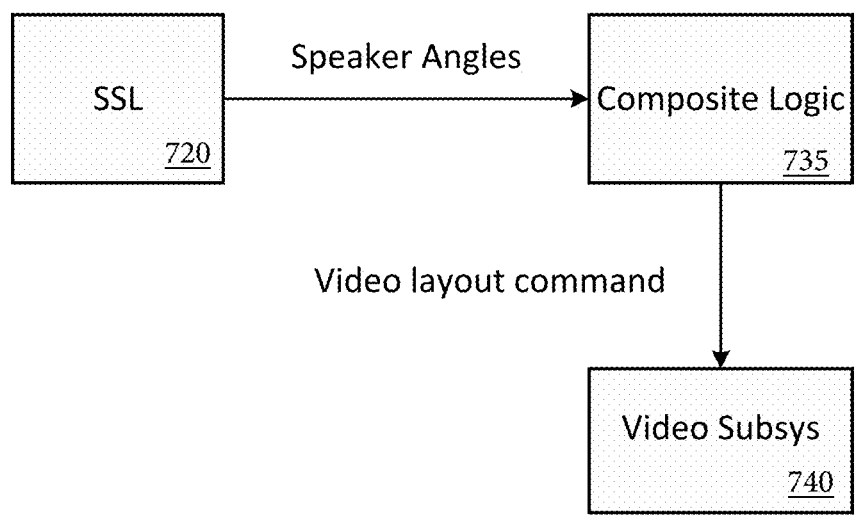

FIG. 12C is a block diagram showing the use of a compositing logic module to implement the automatic framing of two talkers using a 360 degree camera system. At a high level, the automatic framing of the two active speakers system contains three parts, sound source localization (SSL) module 720, a compositing logic module 735 and a video subsystem 740. An SSL module is shown providing input to the compositing logic module including the angular measurement of a speaker. The composite logic module processes the data it receives to compose a video stream for later display. The compositing logic module then provides video layout commands to a video subsystem.

Referring generally to FIG. 12C, the automatic framing of video for two talkers may be implemented by modifying existing available products that include the use of a 360 degree cameras for example, Polycom's CX5000 and CX5x00 products. It can be implemented using the hardware configurations of these current products or with modified or new hardware.

In one embodiment separate processing boards are used for the SSL and compositing logic module with separate processors and memories. However, overlapping hardware may be used. The incoming signals from the 360 degree camera are not shown in FIG. 2. Depending on the embodiment, the 360 degree camera may be connected to both the compositing logic module and the video subsystem.

The software for the two talker rules can be operated on computer equipment networked into the video conferencing system. For example, one or more MCUs can be used to process the software to support the two talker rules.

The software module which performs much of the composing of the video for display is called the compositing logic module, which takes input from a sound source localization (SSL) module and it commands the video subsystems to perform the proper compositing operations. The SSL module determines in real time who is speaking and the angular location of each of the speakers. The SSL outputs in real time or relatively quick fashion, the speaker location as an angle in degrees, typically an angle between 0 and 359 degrees.

The compositing logic includes a "discussion pattern" detector to determine if two speakers have been talking back and forth for some period of time. It does so by looking at alternating pattern of two current speaker locations over time. If the locations show that the same two speakers are exchanging dialog the system determines that a two speaker discussion is occurring. The compositing logic can also determine if there are three or more active speakers using the speaker locations.

In one embodiment, once a two person discussion pattern is detected by the compositing module, the process of automatically compose or frame a video display having two or more active speakers commences or is triggered. If there is only one speaker, the two speaker framing is not necessary.

FIGS. 12D to 12H show individuals around a table and the improved video layouts for a 360 degree camera system. FIGS. 12I to 12K show the logic behind the composing of the two talker video layouts. The figures depict improved compositions of video for display of two speakers based upon the location of the active speakers in the circle. More particularly, the figures show the improved layout based on the angular location (measured from zero to 360 degrees) of each of the two active speakers in a discussion. Each individual speakers angular location in the circle (0 to 360 degrees) can be determined or measured. The angular location of the speakers are used to compose the video layout for later display. These methods could also be applied in instances of 3 or more active speakers.

FIG. 12I provides an overview of the steps of the automatic framing or composing. In general terms, the first video composing step is to determine 1201 whether there are two or more speakers interacting in the same room. Afterwards, an angular distance between the two interacting speakers is measured or determined 1203. These determinations can be made by an SSL, other sensory or stimulus detectors. Following a distance determination, the composite logic determines 1206 whether the angular distance is less than a simple or single view camera. Typically a simple view camera angle would be between approximately 40 and 100 degrees. In one embodiment, the determination is whether the two active speakers are less than 80 degrees apart (single view camera angle). In other words, a less than 80 degree condition is checked by the compositing logic module. If the two speakers are less than 80 degrees apart, in some embodiments the video subsystem will show a simple view of both speakers from a single camera or camera angle, a simple camera view. That is the system will compose 1209 a single camera view for display.

Generally, if the two active speakers are farther apart than the single view camera angle (e.g. 80 degrees), then the composite logic arranges 1212 the two speakers on the video to face each other. In one embodiment, a check or determination is made of the 180 degree condition in order to determine which speaker should be placed on the left part of a split video screen and which speaker should be placed on right portion. This is described in detail below. Ultimately, an appropriate output, a composite video layout commands are transmitted to the video subsystem shown in FIG. 12C.

FIG. 12J shows another embodiment of the automatic composing of display with two active speakers for use in a 360 degree video system. In particular, FIG. 12J shows the flow or steps that are used by one embodiment of the compositing logic module.

Detect a discussion pattern 1205.

Determine if a two person discussion is occurring 1210 if so continue if not, the process is complete.

Receive the individual angular measurement for each person wherein angle a is for Speaker a and angle b is for Speaker B. (1215)

Take the absolute value of angle a minus angle b to determine the angle between the two speakers. (1220)

If the angle is less than a simple or single view camera angle then the process proceeds to an averaging step 1225. The averaging step averages the two angles a and b. This can be done in several ways, but may be accomplished by adding the two angles and dividing by two.

If the absolute value of the angle is greater than the simple camera angle than an additional check or determination about the angle is made at step 1230. Is the angle greater than or less than 180 degrees or greater than or less than a chosen split angle (whatever the split angle is that is chosen). For two active speakers, the spilt angle may be for example in the range of 170 to 190 degrees with 180 degrees preferred.

After the determination that the angle is greater than or less than a split angle, the video can be laid out. In particular, if the answer is yes then, at step 1235, the video can be composed with Speaker A on left and speaker B, otherwise, at step 1240, the video is laid out with speaker A on the right and speaker B on the left.

FIG. 12K is a flow chart diagram of the automatic process 1249. In the flow chart diagram, pseudo C code is used to illustrate the logic. For simplicity of explanation, SSL location is based on a fixed origin (0 degree position), and all angles are in (0, 360) degrees range. In implementation, this can be varied. The pseudo C code takes these angles into consideration and is similar to the other methods described herein. The process 1249 can start at step 1250 in which a current speaker is received from the SSL. The process proceeds to step 1252 in which a discussion pattern detector is activated. The discussion pattern detector determines 1254 whether there are two people having a conversation. If not, a simple view is used in which the angle of a camera is set to correspond to that of a current speaker. If there are two people having a conversation the process 1249 moves to step 1258 in which an angular positions of the speakers are determined. The process 1249 then determines 1260 whether the angle between the two speakers is less than or equal to 80 degrees. If not, a simple view is provided 1262, in which the camera angle is set to be the average of the angles of the speakers (relative the same point). If the angle between the speakers is greater than 80 degrees, the process 1249 moves to step 1264, in which the angular distance between the speakers, relative a fixed point, is calculated. If the angular distance is less than 180 degrees then the first speaker will be displayed on the left and the second speaker (relative the first speaker in a clockwise direction) will be displayed 1270 on the right. Otherwise, the first speaker will be displayed on the right and the second speaker will be displayed on the left, at step 1268. (Compare FIG. 2L in which the angular distance between the speakers exceeds 180 degrees, with FIG. 2M, in which the angular distance between the speakers is less than 180 degrees.

Following is a specific example, as shown in FIGS. 12A and 12B, if the SSL detects two talkers are less than 80 degrees apart from each other the system directs the cameras at that location and composes a shot of both people together.

Figure 12D:
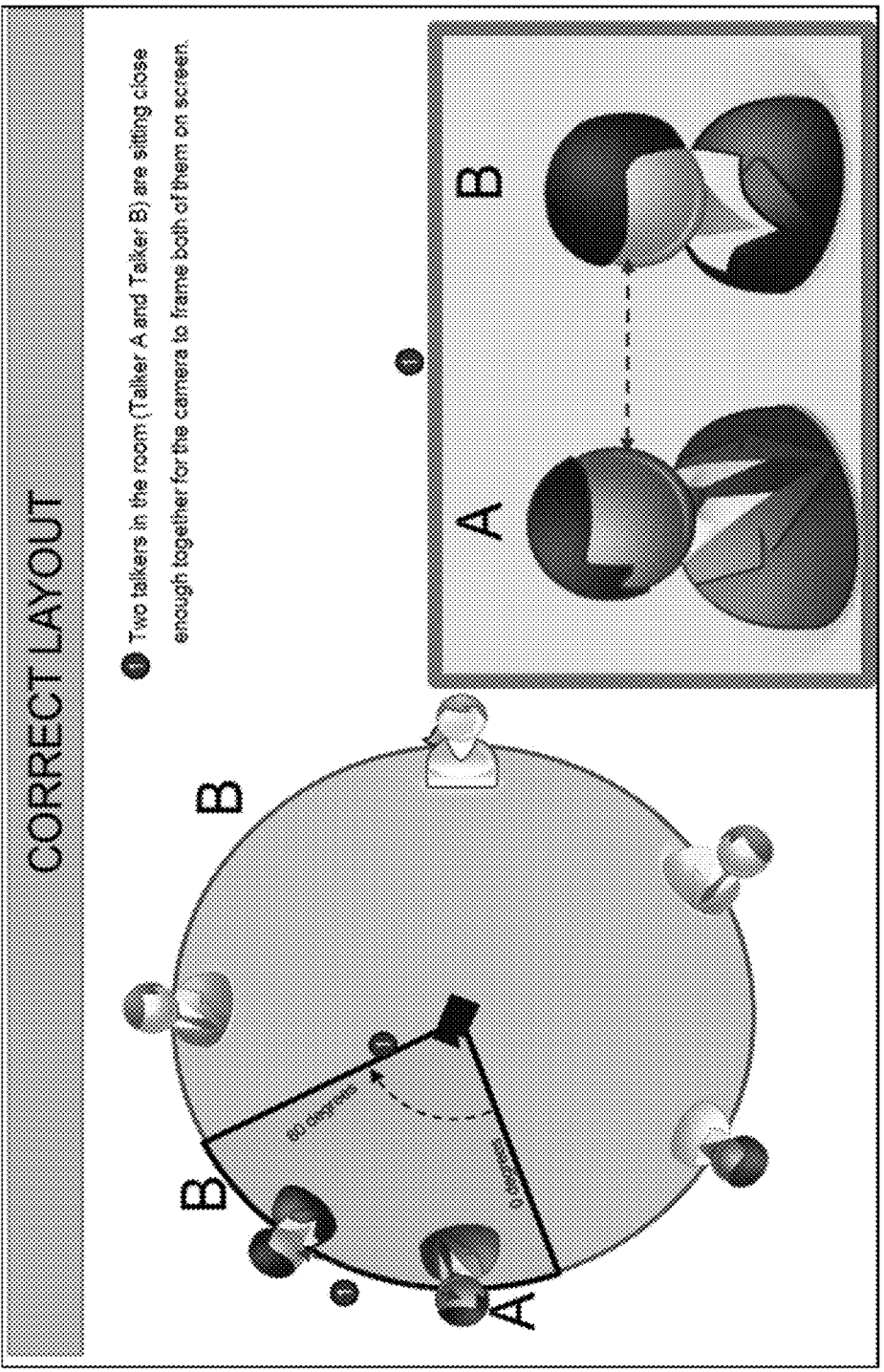
Figure 12E:
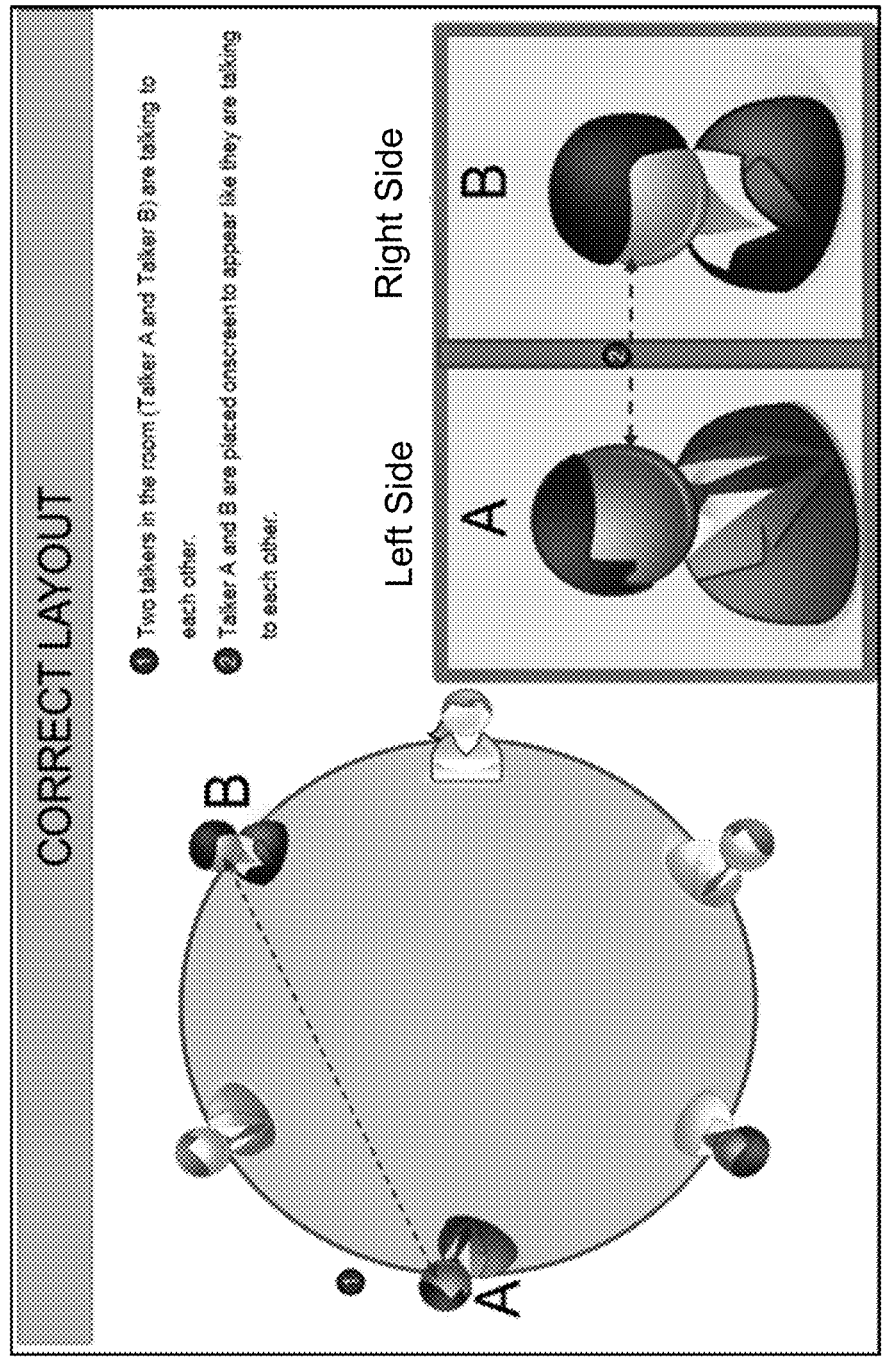
Figure 12F:
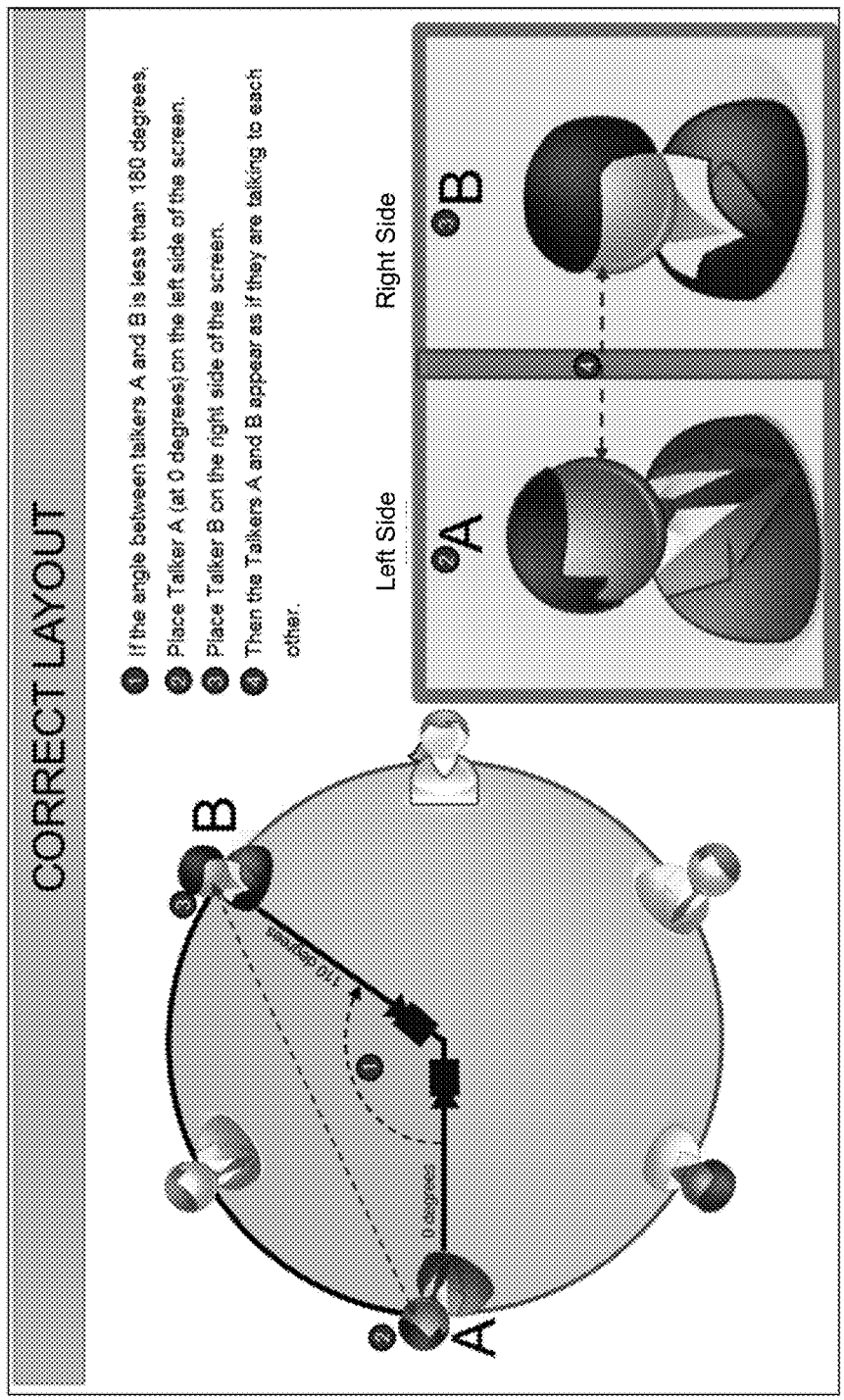
Figure 12G:
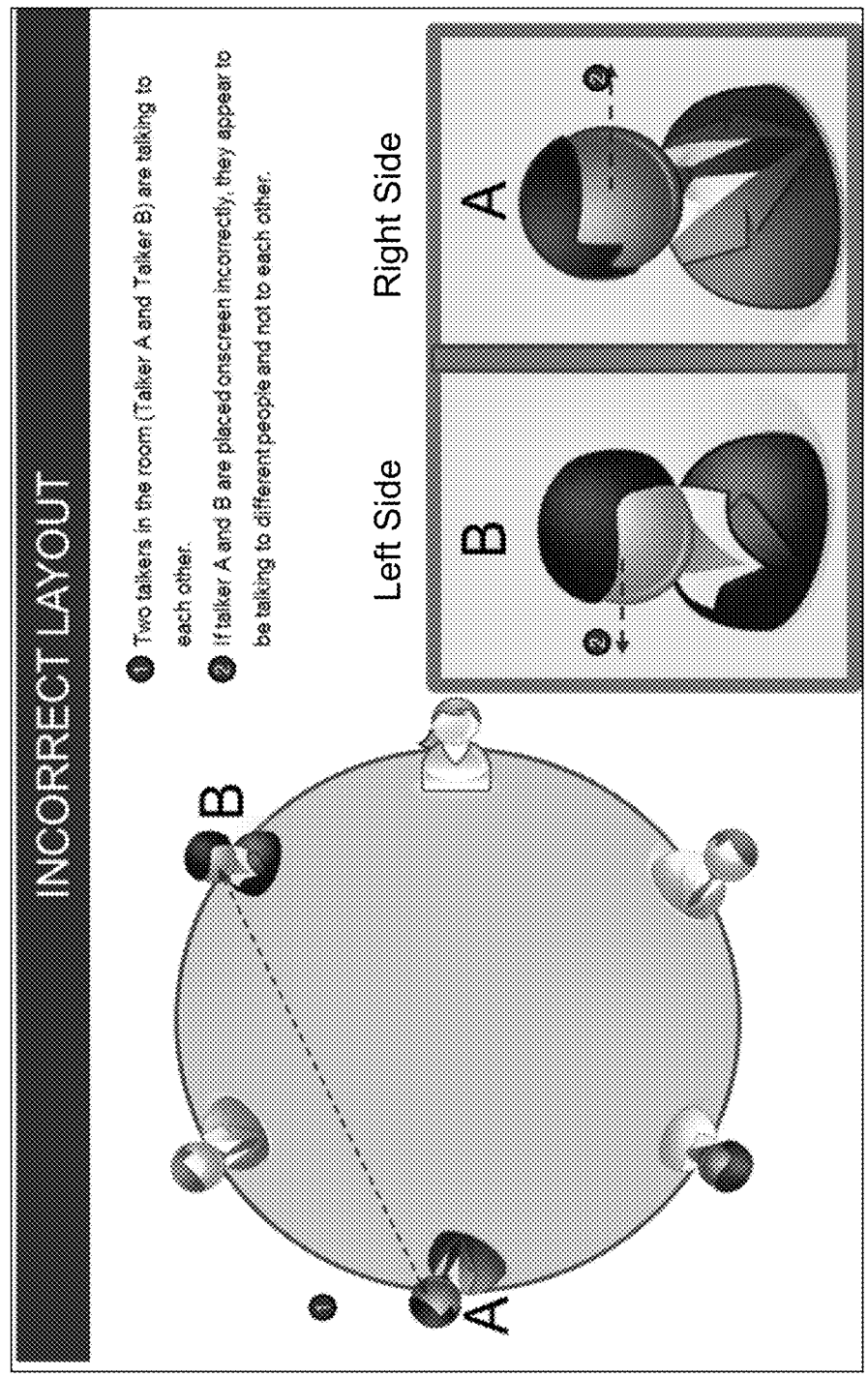
Figure 12H:
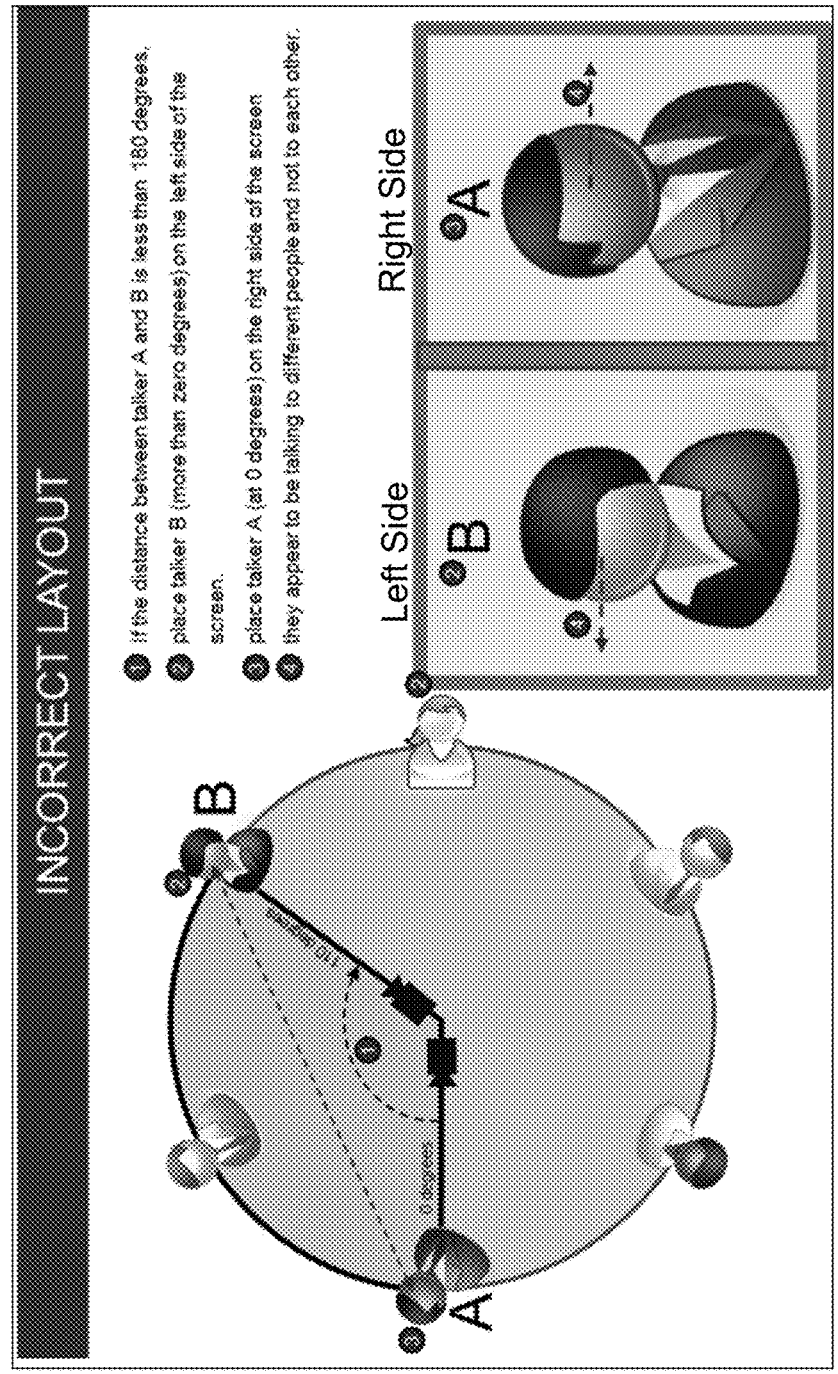
Figure 12I:
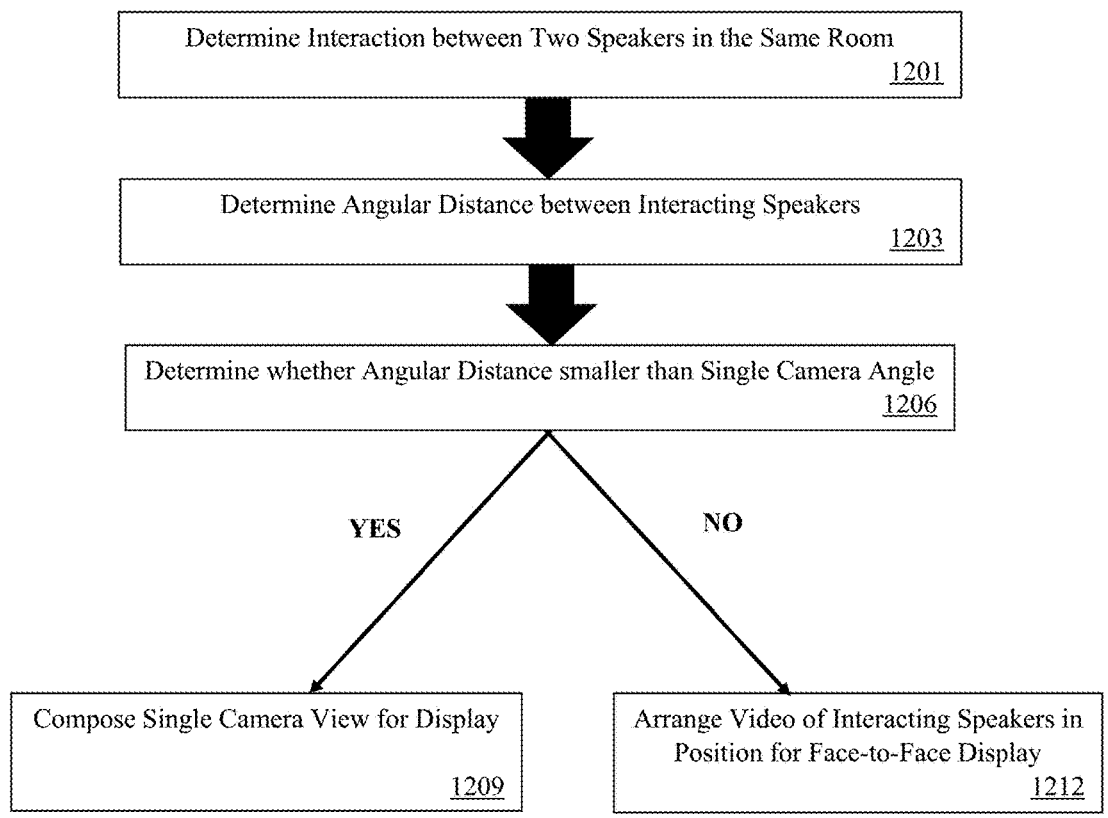
Figure 12J:
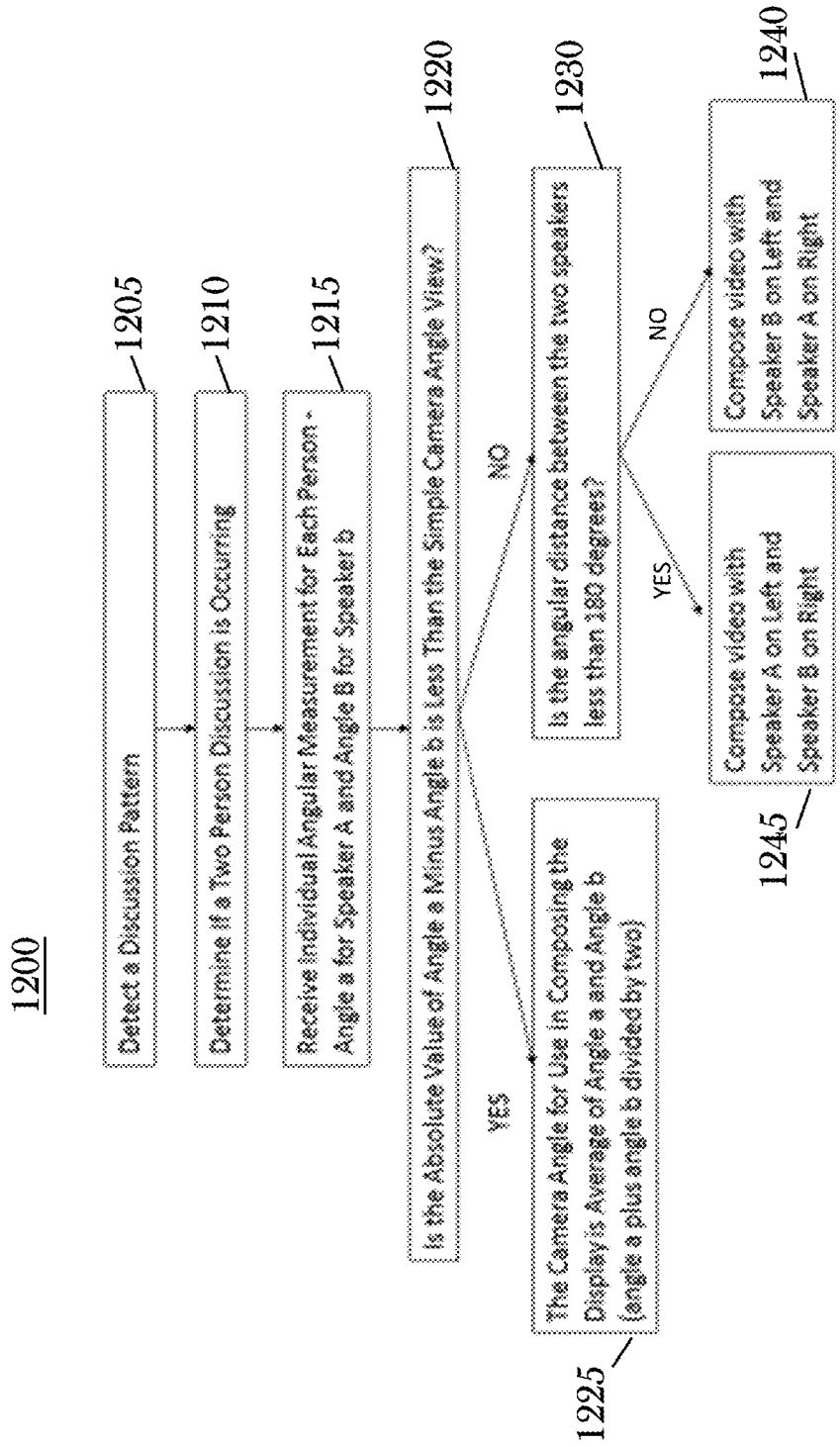
Figure 12K:
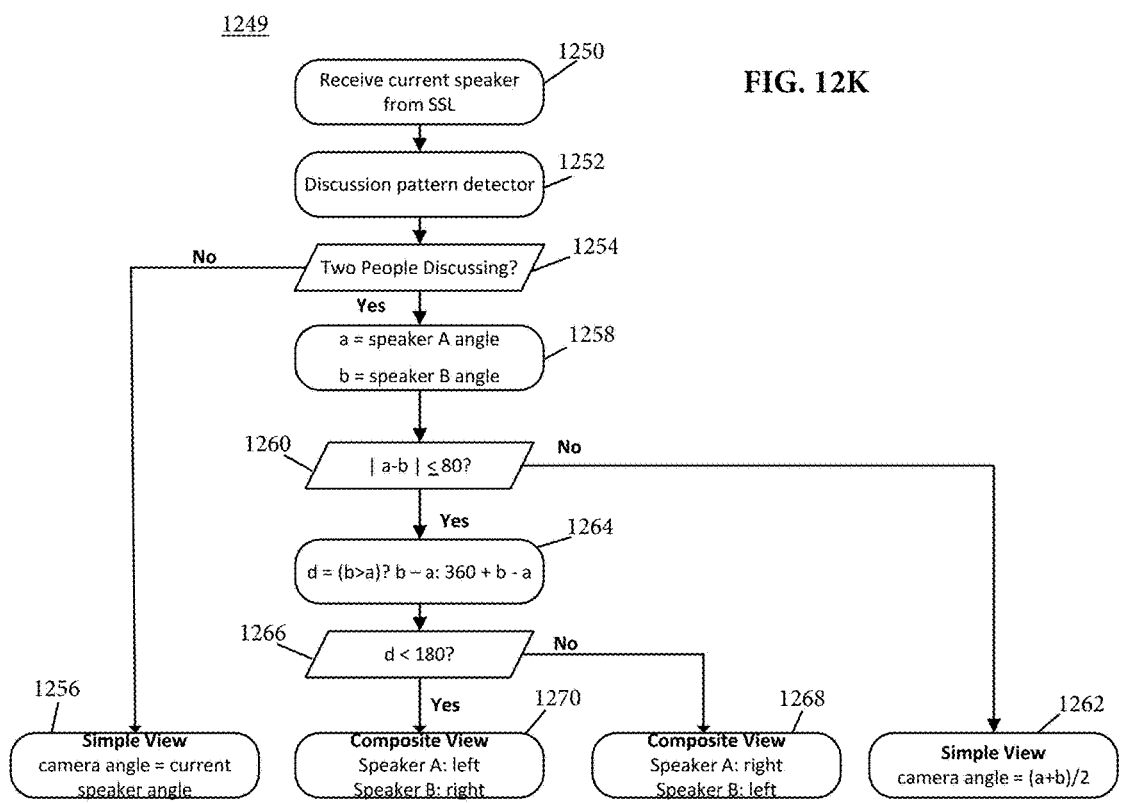

As shown in FIG. 12C and FIG. 12D, if the SSL detects two talkers (talker A and B) are more than 80 degrees and less than 180 degrees from of each other, the system frames the video to place talker A on the left side of the screen and talker B on the right side of the screen.

Figure 12L:
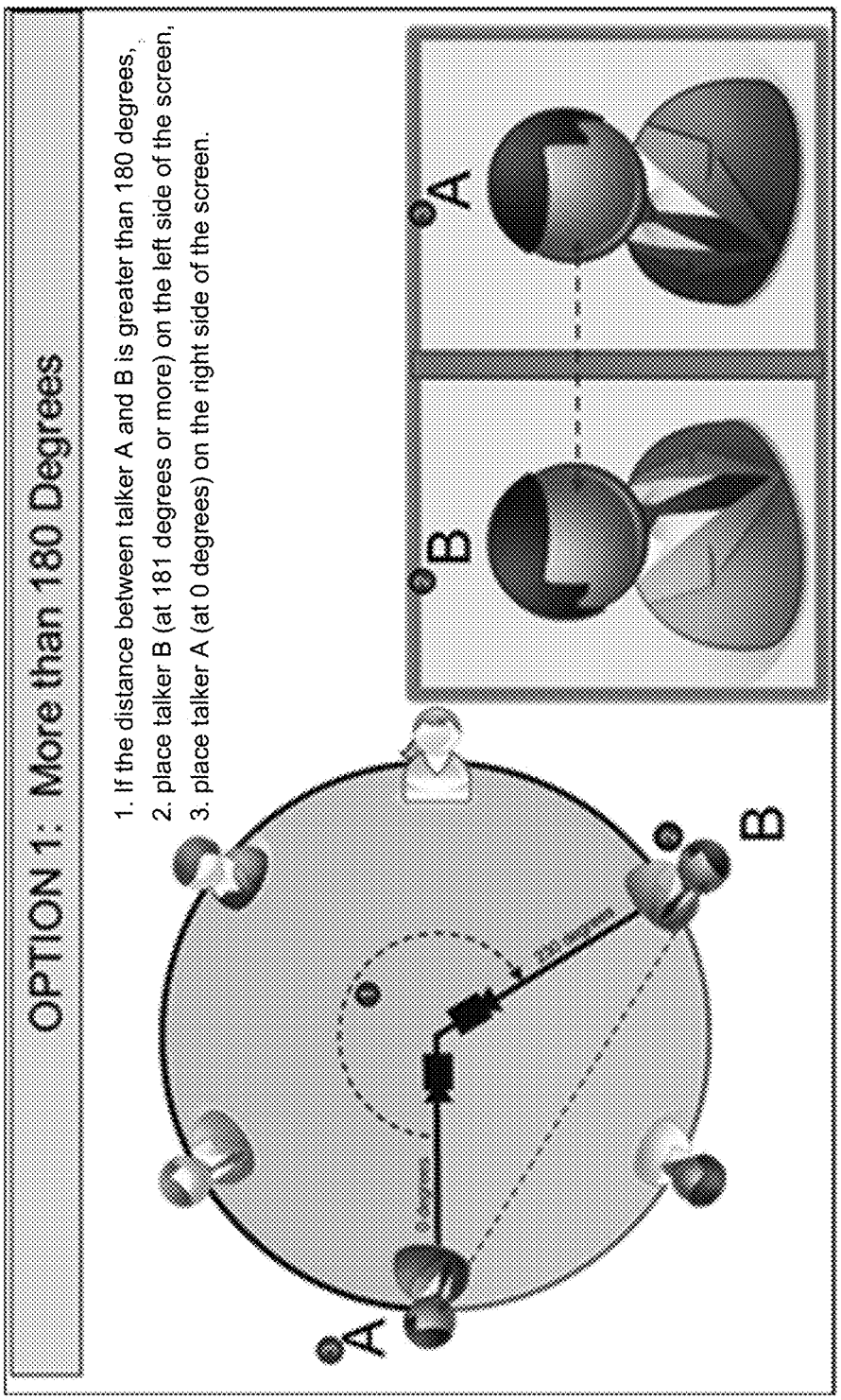

As shown in FIG. 12L, if the SSL detects two talkers (talker A and B) are more than 180 from of each other, the system frames the video to place talker B on the left side of the screen and talker A on the right side of the screen.

Figure 12M:
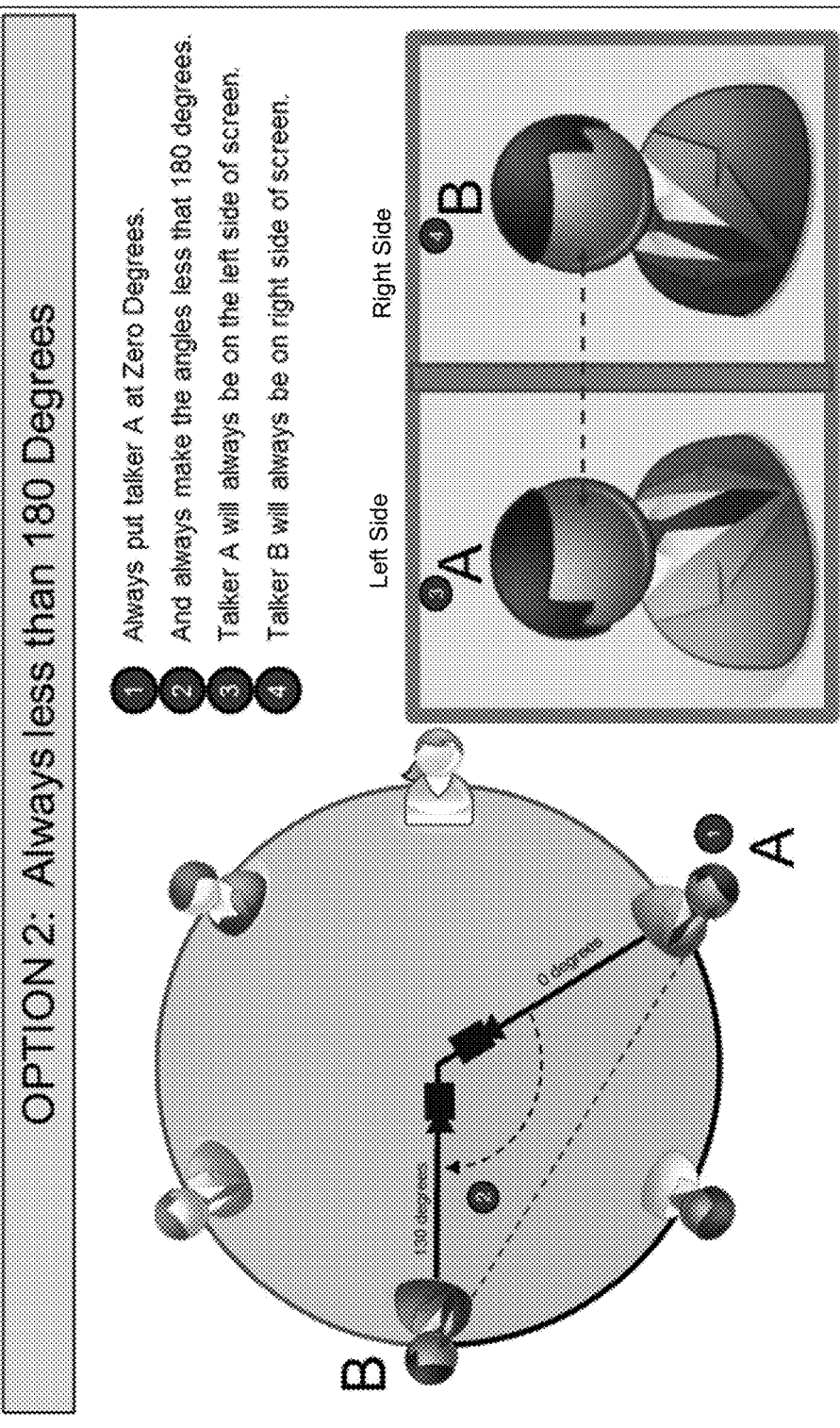

Referring to FIG. 12M, in an alternative embodiment, instead of the system trying to determine whether the angle is between talkers is greater than or less than 180 degrees, the system always uses an angle that is less than 180 degrees to orient the A and B talker.

Figure 12N:
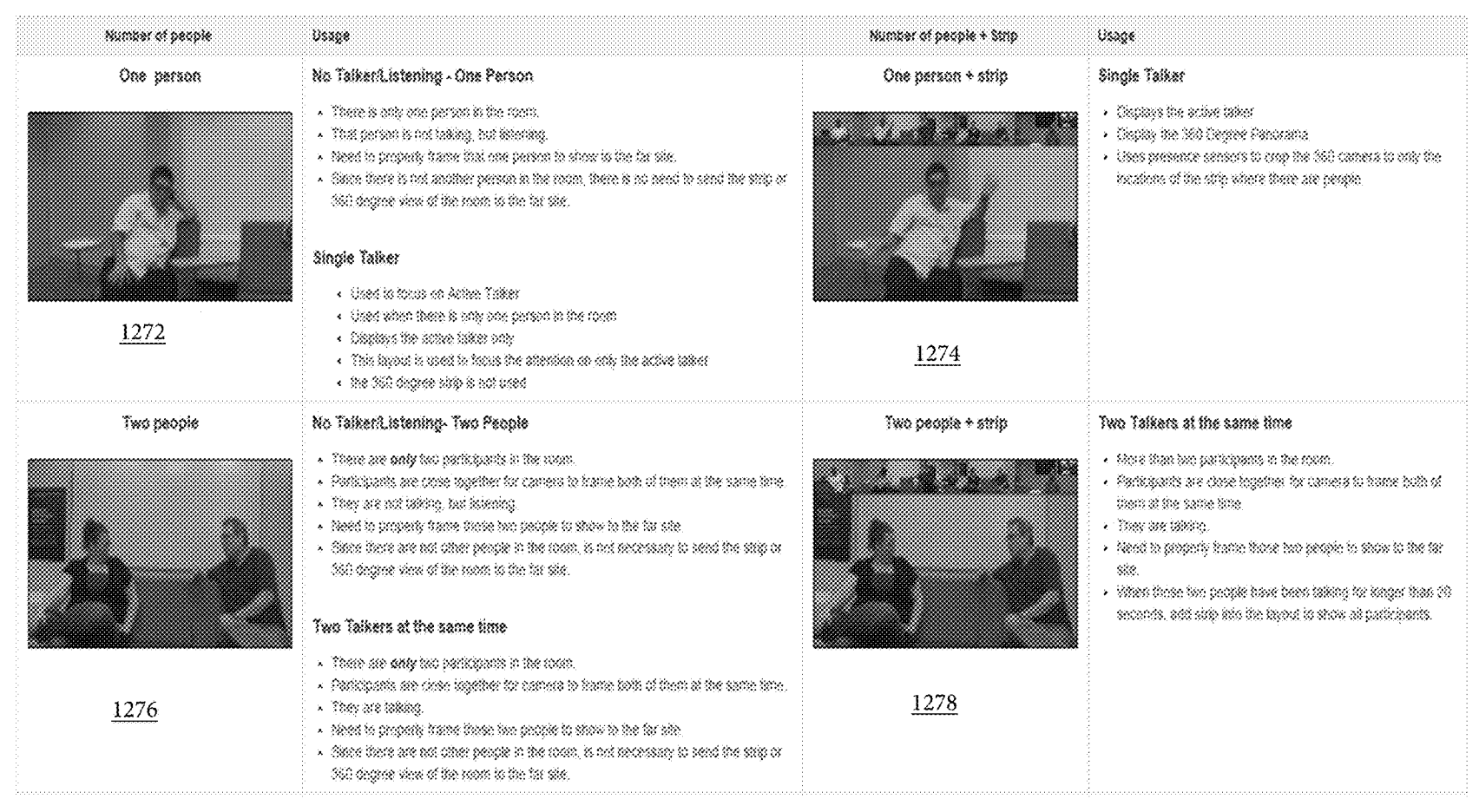
Figure 12O:
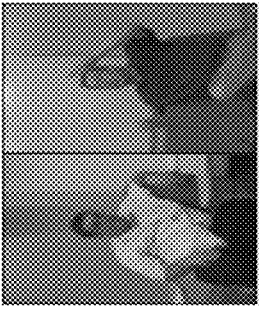

The following charts, shown as FIGS. 12N and 12O, show examples of when a particular video layout may be useful and when the video production rules may guide the system to the layout. Example 1272 is a one person view. This is useful when only one person is in a room to show one person listening or one person talking. Example 1274 shows a single speaker prominently displayed while other persons are shown in a panoramic strip. Note that there are no views in the panoramic strip that do not contain a person. Example 1276 shows a two person simple view. Two people are talking to each other nearby and are captured by a single camera. Example 1278 is similar to Example 1276 except that in addition to the two people talking, there are others present in the same location. The others are shown in a panoramic strip. Example 1280 shows two persons talking in a room who are too far apart to be captured by a single camera; they are displayed as each partially turned towards the other. Example 1282 is the same as Example 1280 except that there are additional persons shown in a strip above the two speakers. Example 1284 shows two large panoramic strips. This display arrangement is used when more than two people are talking at the same time or when more than two people are in a room but nobody is speaking.

Figure 13:
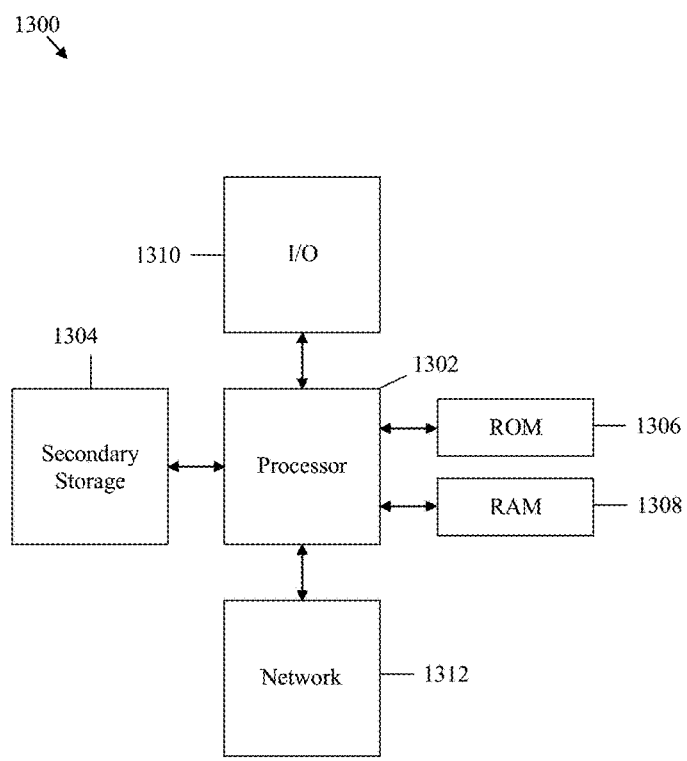
FIG. 13 shows a network component 1300 in accordance with an embodiment of this disclosure.

FIG. 13 illustrates a network component 1300 that may correspond to or may be part of a network component, such as a server, a switch, a router, or any other network nodes. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The general-purpose network component 1300 may also comprise, at the processor 1302 and or any of the other components of the general-purpose network component 1300.

The processor 1302 may be implemented as one or more CPU chips, or may be part of one or more application specific integrated circuits (ASICs) and/or digital signal processors (DSPs). The processor 1302 may comprise a central processor unit or CPU. The processor may be implemented as one or more CPU chips. The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

The foregoing description and drawings should be considered as illustrative only of the principles of the present invention. The invention may be configured in a variety of ways and is not intended to be limited by the shown embodiments. For example, elements of the rules may be combined in any useful manner that will be readily apparent to skilled artisans. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of this disclosure.

What is claimed is:

1. A method for composing a display for use in a video system having an active talker video stream and a panoramic view video stream having more than one person in video, the method comprising:
   determining, using a processor, a region of interest in a panoramic view video using motion detection and presence sensors;
   preparing, using the processor, the panoramic view video by centering the region of interest and by zooming towards the region of interest, based upon location of persons in the panoramic view video; and
   determining, using the processor and responsive to a change in position of an active talker, where to place the panoramic view video on a composite display to prevent the panoramic view video from overlaying display of the active talker in the active talker video stream while maintaining a scale of the active talker video stream.

2. The method of claim 1 wherein the step of determining where to place the panoramic view video comprises:
   determining the location of the active talker and placing the panoramic view video at bottom of a display.

3. The method of claim 1 wherein the step of determining where to place the panoramic view video comprises:
   placing the panoramic view video at top of display.

4. The method of claim 1 wherein the step of determining where to place the panoramic view video comprises removing the panoramic view video from display.

5. The method of claim 1 further comprising shifting the active talker video stream lower so that an upper portion of the active talker video stream is cropped.

6. The method of claim 1 further comprising shifting the active talker video stream higher so that a lower portion of the active talker video stream is cropped.

7. A multipoint control unit (MCU) for intelligently displaying an active talker video stream and a panoramic view video stream having more than one person in video, the MCU comprising:
   at least one display device;
   at least one camera coupled to the at least one display device;
   a processor coupled to the at least one camera and the at least one display device, the processor having a set of computer readable instructions associated therewith, the processor configured to, upon execution of the instructions, cause the MCU to:
   determine a region of interest in a panoramic view video using motion detection and presence sensors;
   prepare the panoramic view video by centering the region of interest and by zooming towards the region of interest, based upon location of persons in the panoramic view video; and
   determine, responsive to a detection of a change in position of an active talker within the active talker video stream, where to display the panoramic view video on a composite display rendered on the at least one display device to prevent the panoramic view video from overlaying display of the active talker on the active talker video stream, while keeping constant scaling of the active talker video stream.

8. The MCU of claim 7 wherein the instructions further comprise instructions to determine where to place the panoramic view video based on determining the location of the active talker and placing the panoramic view video at bottom of the at least one display device.

9. The MCU of claim 7 wherein determining where to place the panoramic view video comprises:
placing the panoramic view video at top of the at least one display device.

10. The MCU of claim 7 wherein determining where to place the panoramic view video comprises removing the panoramic view video from the at least one display device.

11. The MCU of claim 7; further configured to shift the position of the active talker video stream lower so that an upper portion of the active talker video stream is cropped.

12. The MCU of claim 7, further configured to shift the active talker video stream higher so that a lower portion of the active talker video stream is cropped.

13. A method for composing a display for use in a video system having an active talker video stream and a panoramic view video stream having more than one person in video, the method comprising:
determining a region of interest in a panoramic view video using motion detection and presence sensors;
preparing for display the panoramic view video including centering the region of interest and zooming towards location of one or more persons in the panoramic view video; and
automatically arranging a composite display on a display device, the composite display including both the active talker video stream and the prepared panoramic view video, wherein the panoramic view video overlays a portion of the active talker video stream and does not overlay a display of an active talker in the active talker video stream, and scaling of the active talker video stream is constant throughout any change of position of the active talker therein.

14. The method of claim 13 wherein the active talker is centrally displayed on the display device.

15. The method of claim 13 wherein arranging a composite display comprises shifting display of active talker video stream lower on the display device.

16. The method of claim 13 wherein arranging a display further comprises shifting display of the active talker video stream higher on the display device.

17. A multipoint control unit (MCU) for intelligently displaying an active talker video stream and a panoramic view video stream having more than one person in video, the MCU comprising:
at least one display device;
at least one camera coupled to the display device;
a processor coupled to the camera and display device, the processor having a set of computer readable instructions associated therewith, the processor configured to, upon execution of the instructions, control the MCU to:
determine a region of interest in a panoramic view video using motion detection and presence sensors;
prepare for display the panoramic view video including centering the region of interest and zooming towards location of one or more persons in the panoramic view video; and
arrange a composite display on the display device, the composite display including both the active talker video stream and the prepared panoramic view video, wherein the panoramic view video overlays a portion of the active talker video stream and does not overlay a display of an active talker in the active talker video stream, and scaling of the active talker video stream is constant throughout any change of position of the active talker therein.

18. The MCU of claim 17 wherein the instructions further comprise instructions to control the MCU to centrally display the active talker on the display device.

19. The MCU of claim 17 wherein arranging a composite display comprises shifting lower display of active talker video lower on the display device.

20. The MCU of claim 17 wherein the panoramic view includes at least one of closed captioning information, pre-recorded video, or other graphical information.

* * * * *